(12) United States Patent
Liu et al.

(10) Patent No.: US 11,924,135 B2
(45) Date of Patent: Mar. 5, 2024

(54) METHOD AND DEVICE IN NODES USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/743,458

(22) Filed: May 13, 2022

(65) Prior Publication Data
US 2022/0271893 A1 Aug. 25, 2022

Related U.S. Application Data

(63) Continuation of application No. PCT/CN2020/124692, filed on Oct. 29, 2020.

(30) Foreign Application Priority Data

Nov. 15, 2019 (CN) .......................... 201911121404.5
Nov. 22, 2019 (CN) .......................... 201911159432.6

(51) Int. Cl.
*H04L 5/00* (2006.01)

(52) U.S. Cl.
CPC .......... *H04L 5/0051* (2013.01); *H04L 5/0064* (2013.01)

(58) Field of Classification Search
CPC ....... H04L 1/18; H04L 1/1812; H04L 5/0051; H04L 5/0055; H04L 5/0064;
(Continued)

(56) References Cited

U.S. PATENT DOCUMENTS

2009/0239545 A1 9/2009 Lee
2021/0136781 A1* 5/2021 Hosseini ............... H04W 72/23
(Continued)

FOREIGN PATENT DOCUMENTS

| CN | 104602350 A | 5/2015 |
| CN | 107027189 A | 8/2017 |

(Continued)

OTHER PUBLICATIONS

ISR received in application No. PCT/CN2020/124692 dated Jan. 27, 2021.
(Continued)

*Primary Examiner* — Pao Sinkantarakorn

(57) ABSTRACT

The present disclosure provides a method and a device in a node for wireless communications. A first node receives a first signaling; transmits a second signaling; and transmits a first signal in a second time-frequency resource set; the second time-frequency resource set belongs to a target resource sub-pool; the first signaling is used to determine a first identifier, a first priority and a reference time-frequency resource set; a first time-frequency resource set is related to the reference time-frequency resource set; the second signaling is used to indicate a second identifier, a second priority and the second time-frequency resource set; a relationship between a first transmission node identified by the first identifier and a second transmission node identified by the second identifier. The present disclosure offers an effective way of addressing the resource wastes and transmission delay resulting from PSFCH conflicts in the NR V2X system.

20 Claims, 9 Drawing Sheets

(58) Field of Classification Search
CPC ...... H04L 5/0092; H04W 4/40; H04W 72/02; H04W 72/04; H04W 72/25; H04W 72/40; H04W 72/56–569
See application file for complete search history.

(56) References Cited

U.S. PATENT DOCUMENTS

| | | | | |
|---|---|---|---|---|
| 2021/0144736 | A1* | 5/2021 | Li | H04W 72/23 |
| 2021/0400681 | A1* | 12/2021 | Wang | H04W 72/0446 |
| 2022/0124729 | A1* | 4/2022 | Ji | H04L 1/1861 |

FOREIGN PATENT DOCUMENTS

| | | |
|---|---|---|
| CN | 107343297 A | 11/2017 |
| CN | 109245869 A | 1/2019 |
| CN | 109391346 A | 2/2019 |
| CN | 109392115 A | 2/2019 |
| CN | 109478991 A | 3/2019 |
| CN | 109525377 A | 3/2019 |
| CN | 109891967 A | 6/2019 |
| CN | 110012540 A | 7/2019 |
| CN | 110099451 A | 8/2019 |
| CN | 110311762 A | 10/2019 |
| CN | 110366191 A | 10/2019 |

OTHER PUBLICATIONS

First Office Action of Chinses patent application No. CN201911159432.6 dated Nov. 2, 2021.
First Search Report of Chinses patent application No. CN201911159432.6 dated Oct. 27, 2021.
Notification to Grant Patent Right for Invention of Chinses patent application No. CN201911159432.6 dated Mar. 11, 2022.
Huawei, HiSilicon Sidelink resource allocation mode 2 for NR V2X 3GPP TSG RAN WG1 Meeting #99 R1-1911884 Nov. 9, 2019.
Intel Corporation Design of Resource Allocation Mode-2 for NR V2X Sidelink Communication 3GPP TSG RAN WG1 Meeting #99 R1-1912205 Nov. 9, 2019.
Ericsson (TP for NR BL CR for TS 38.423) Xn signaling for E-UTRA—NR Cell Resource Coordination 3GPP TSG-RAN WG3 Meeting #101 R3-185284 Aug. 24, 2018.

* cited by examiner

METHOD AND DEVICE IN NODES USED FOR WIRELESS COMMUNICATION

CROSS REFERENCE TO RELATED APPLICATIONS

This application is a continuation of International patent application No. PCT/CN2020/124692, filed on Oct. 29, 2020, which claims the priority benefit of Chinese Patent Application No. 201911121404.5, filed on Nov. 15, 2019, and the priority benefit of Chinese Patent Application No. 201911159432.6, filed on Nov. 22, 2019, the full disclosure of which is incorporated herein by reference.

BACKGROUND

Technical Field

The present disclosure relates to transmission methods and devices in wireless communication systems, and in particular to a method and a device of sidelink-related transmission in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP has embarked on its work of standards setting and studies around the NR framework. At present, the 3GPP has finished regulations of requirements targeting the 5G V2X traffics which are included in the TS 22.886. The 3GPP has identified and defined 4 major Use Case Groups for 5G V2X services: Vehicles Platooning, Extended Sensors, Advanced Driving and Remote Driving. The study of NR-based V2X techniques has been started at the 3GPP RAN #80 Plenary, and it was agreed at the RAN1 2019 1st AdHoc Conference that a Pathloss between a transmitting end and a receiving end of a V2X pair will serve as a reference for a transmit power of V2X.

SUMMARY

In an NR V2X system, a resource location for a Physical Sidelink Feedback Channel (PSFCH) corresponding to a Physical Sidelink Control Channel (PSCCH)/Physical Sidelink Shared Channel (PSSCH) is implicitly associated with the PSCCH/PSSCH. Hence, there is at least one PSFCH corresponding to a PSCCH/PSSCH. According to the latest progress in NR V2X, PSFCHs associated with PSCCHs/PSSCHs for 1, 2 or 4 slots may be within a same multicarrier symbol. For example, in a case where PSFCHs associated with PSCCHs/PSSCHs for 4 slots are on a same symbol, when a TX UE transmits data in any one of the 4 slots and receives data in the other, since the Hybrid Automatic Repeat request-Acknowledge/Negative Acknowledge (HARQ-ACK/NACK) for these two data packets are sent back to a same symbol, conflicts of receiving/transmitting will occur in the TX UE, which has to discard a HARQ-ACK/NACK feedback for one packet of the two; or, when two TX UEs both transmit data to a same RX UE within the 4 slots, HARQ-ACK/NACK feedbacks for the two packets will be on a same symbol, provided that the RX UE cannot transmit 2 PSFCHs at the same time, it will have to drop one of the HARQ-ACK/NACK feedbacks. This will cause an enormous waste of resources and a large delay of data transmission.

To address the above problem, the present disclosure discloses a scheme of V2X resource selection to effectively address the issue of resource wastes and transmission relay resulting from PSFCH conflict in the NR V2X system. It should be noted that if no conflict is incurred, embodiments in a User Equipment (UE) in the present disclosure and the characteristics of the embodiments are also applicable to a base station, and vice versa. What's more, the embodiments in the present disclosure and the characteristics in the embodiments can be arbitrarily combined if there is no conflict. Further, though originally targeted at Sidelink (SL), the present disclosure also applies to Uplink (UL). Further, though originally targeted at single-carrier communications, the present disclosure also applies to multi-carrier communications. Further, though originally targeted at single-antenna communications, the present disclosure also applies to multi-antenna communications. Further, the present disclosure is designed targeting V2X scenario, but can be applied to terminal-base station communications, terminal-relay communications as well as relay-base station communications, where similar technical effects can be achieved. Additionally, the adoption of a unified solution for various scenarios, including but not limited to V2X scenario and terminal-base station communications, contributes to the reduction of hardcore complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling, the first signaling being used to determine a first identifier and a first priority;

transmitting a second signaling, the second signaling being used to indicate a second identifier and a second priority; and transmitting a first signal in a second time-frequency resource set, the second time-frequency resource set belonging to a target resource sub-pool;

herein, the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

In one embodiment, a problem to be solved in the present disclosure is the issue of conflicting HARQ-ACK/NACK reception and transmission or conflicts of multiple HARQ-ACK/NACK transmissions on a same time-domain resource.

In one embodiment, a method in the present disclosure is to associate resource selection with HARQ-ACK/NACK conflicts.

In one embodiment, a method in the present disclosure is to associate resource selection with the relationship between transmission nodes.

In one embodiment, a method in the present disclosure is to associate resource selection with priorities of packets corresponding to conflicting HARQ-ACK/NACKs.

In one embodiment, the above method is characterized in that the relationship between the first transmission node and the second transmission node, the first priority and the second priority are jointly used to determine whether the first time-frequency resource set belongs to the target resource sub-pool, thus excluding time-frequency resources that will potentially trigger HARQ-ACK/NACK conflicts.

In one embodiment, the above method has an advantage of effectively addressing the issue of resource wastes and transmission relay resulting from PSFCH conflict in the NR V2X system.

According to one aspect of the present disclosure, the above method is characterized in that the reference time-frequency resource set is used to determine a reference radio resource set, the first time-frequency resource set is used to determine a first radio resource set; time-domain resources comprised in the reference radio resource set and time-domain resources comprised in the first radio resource set are non-orthogonal.

According to one aspect of the present disclosure, the above method is characterized in comprising:
  receiving first information; and
  herein, the first information is used to determine a first time window, time-domain resources comprised in the reference time-frequency resource set belong to the first time window, and time-domain resources comprised in the first time-frequency resource set belong to the first time window.

According to one aspect of the present disclosure, the above method is characterized in comprising:
  determining a first resource pool;
  herein, the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

According to one aspect of the present disclosure, the above method is characterized in that a ratio of a number of time-frequency resource units comprised in the candidate resource pool to a number of time-frequency resource units comprised in the first resource pool is no less than a second threshold; the second threshold is pre-defined, or the second threshold is configurable.

According to one aspect of the present disclosure, the above method is characterized in that a ratio of a number of time-frequency resource units comprised in the target resource sub-pool to a number of time-frequency resource units comprised in the first resource pool is no less than a third threshold; the third threshold is pre-defined, or the third threshold is configurable.

According to one aspect of the present disclosure, the above method is characterized in comprising:
  monitoring a second signal;
  herein, the second signal is used to determine whether the first signal is correctly received; when the second signal is transmitted, the second signal occupies a second radio resource set; the second time-frequency resource set is used to determine the second radio resource set.

According to one aspect of the present disclosure, the above method is characterized in that when the first transmission node and the second transmission node are not the same, the first time-frequency resource set belongs to the target resource sub-pool.

According to one aspect of the present disclosure, the above method is characterized in that when the first transmission node and the second transmission node are the same, a high-low relationship between the first priority and the second priority is used to determine whether the first time-frequency resource set belongs to the target resource sub-pool.

According to one aspect of the present disclosure, the above method is characterized in that when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

According to one aspect of the present disclosure, the above method is characterized in that when the first transmission node and the second transmission node are the same, whether the first transmission node is the same as the first node is used to determine whether the first time-frequency resource set belongs to the target resource sub-pool.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:
  transmitting a first signaling, the first signaling being used to indicate a first identifier and a first priority; and
  transmitting a third signal in a reference time-frequency resource set;
  monitoring a fourth signal in a reference radio resource set;
  herein, the first signaling is used to indicate the reference time-frequency resource set, the fourth signal being used to determine whether the third signal is correctly received; the reference time-frequency resource set is used to determine the reference radio resource set; the first identifier is used for identifying a first transmission node.

According to one aspect of the present disclosure, the above method is characterized in that the first transmission node includes a third node in the present disclosure.

According to one aspect of the present disclosure, the above method is characterized in that the first transmission node includes a first node in the present disclosure.

According to one aspect of the present disclosure, the above method is characterized in comprising:
receiving first information; and
herein, the first information is used to determine a first time window, time-domain resources comprised in the reference time-frequency resource set belong to the first time window.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a method in a third node for wireless communications, comprising:
receiving a second signaling, the second signaling being used to determine a second identifier and a second priority; and
receiving a first signal in a second time-frequency resource set;
herein, the second signaling is used to determine a second time-frequency resource set, the second identifier being used for identifying a second transmission node.

According to one aspect of the present disclosure, the above method is characterized in that the second transmission node includes a third node in the present disclosure.

According to one aspect of the present disclosure, the above method is characterized in comprising:
transmitting a second signal;
herein, the second signal is used to determine whether the first signal is correctly received; when the second signal is transmitted, the second signal occupies a second radio resource set; the second time-frequency resource set is used to determine the second radio resource set.

According to one aspect of the present disclosure, the above method is characterized in comprising:
receiving a first signaling, the first signaling being used to determine a first identifier and a first priority;
receiving a third signal in a reference time-frequency resource set;
herein, the first signaling is used to determine the reference time-frequency resource set, the first identifier being used for identifying a first transmission node, the first transmission node including a third node in the present disclosure.

According to one aspect of the present disclosure, the above method is characterized in comprising:
transmitting a fourth signal in a reference radio resource set;
herein, the fourth signal is used to indicate whether the third signal is correctly received; the reference time-frequency resource set is used to determine a reference radio resource set.

According to one aspect of the present disclosure, the above method is characterized in that when the reference radio resource set and the second radio resource set are non-orthogonal, transmission of the fourth signal is dropped.

According to one aspect of the present disclosure, the above method is characterized in that when the reference radio resource set and the second radio resource set are non-orthogonal, transmission of the second signal is dropped.

According to one aspect of the present disclosure, the above method is characterized in comprising:
receiving first information;
herein, the first information is used to determine a first time window, time-domain resources comprised in the reference time-frequency resource set belong to the first time window.

According to one aspect of the present disclosure, the above method is characterized in that the third node is a UE.

According to one aspect of the present disclosure, the above method is characterized in that the third node is a base station.

According to one aspect of the present disclosure, the above method is characterized in that the third node is a relay node.

The present disclosure provides a first node for wireless communications, comprising:
a first receiver, which receives a first signaling, the first signaling being used to determine a first identifier and a first priority;
a first transmitter, which transmits a second signaling, the second signaling being used to indicate a second identifier and a second priority; and
a second transmitter, which transmits a first signal in a second time-frequency resource set, the second time-frequency resource set belonging to a target resource sub-pool;
herein, the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

The present disclosure provides a second node for wireless communications, comprising:
a third transmitter, transmitting a first signaling, the first signaling being used to indicate a first identifier and a first priority; and
a fourth transmitter, transmitting a third signal in a reference time-frequency resource set; and
a second receiver, monitoring a fourth signal in a reference radio resource set;
herein, the first signaling is used to indicate the reference time-frequency resource set, the fourth signal being used to determine whether the third signal is correctly received; the reference time-frequency resource set is used to determine the reference radio resource set; the first identifier is used for identifying a first transmission node.

The present disclosure provides a third node for wireless communications, comprising:
a third receiver, receiving a second signaling, the second signaling being used to determine a second identifier and a second priority; and a fourth receiver, receiving a first signal in a second time-frequency resource set;

herein, the second signaling is used to determine a second time-frequency resource set, the second identifier being used for identifying a second transmission node.

In one embodiment, the present disclosure has the following advantages.

the present disclosure associates resource selection with HARQ-ACK/NACK conflicts.

the present disclosure associates resource selection with the relationship between transmission nodes.

the present disclosure associates resource selection with priorities of packets corresponding to conflicting HARQ-ACK/NACKs.

in the present disclosure, the relationship between the first transmission node and the second transmission node, the first priority and the second priority are jointly used to determine whether the first time-frequency resource set belongs to the target resource sub-pool, thus excluding time-frequency resources that will potentially trigger HARQ-ACK/NACK conflicts.

the present disclosure effectively addresses the issue of resource wastes and transmission relay resulting from PSFCH conflict in the NR V2X system.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that if no conflict is caused, the embodiments in the present disclosure and the characteristics in the embodiments can be arbitrarily combined.

Embodiment 1

Figure 1:
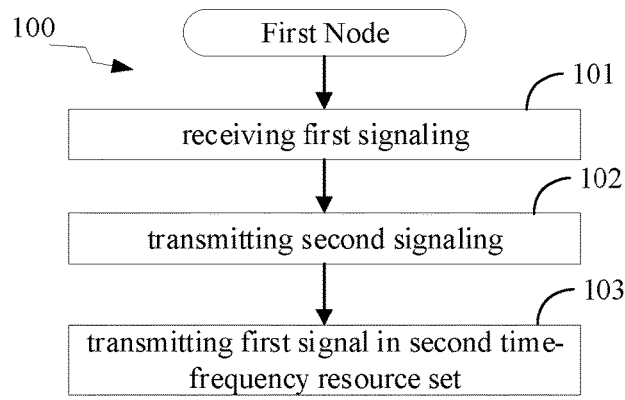
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In FIG. 1, each box represents a step. In Embodiment 1, the first node in the present disclosure executes step 101, to receive a first signaling, and executes step 102, to transmit a second signaling; and finally executes step 103, to transmit a first signal in a second time-frequency resource set; the first signaling is used to determine a first identifier and a first priority; the second signaling is used to indicate a second identifier and a second priority; and the second time-frequency resource set belongs to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

In one embodiment, a channel occupied by the first signaling comprises a Physical Sidelink Control Channel (PSCCH).

In one embodiment, a channel occupied by the first signaling comprises a Physical Sidelink Shared Channel (PSSCH).

In one embodiment, a channel occupied by the first signaling comprises a Physical Downlink Control Channel (PDCCH).

In one embodiment, the first signaling is transmitted by Broadcast.

In one embodiment, the first signaling is transmitted by Groupcast.

In one embodiment, the first signaling is transmitted by Unicast.

In one embodiment, the first signaling is Cell-Specific.

In one embodiment, the first signaling is UE-Specific.

In one embodiment, the first signaling comprises one or more fields in a piece of Sidelink Control Information (SCI).

In one embodiment, the first signaling is SCI.

In one embodiment, the first signaling comprises 1st-stage SCI.

In one embodiment, the first signaling comprises 2nd-stage SCI.

In one embodiment, the first signaling comprises 1st-stage SCI and 2nd-stage SCI.

In one embodiment, the first signaling comprises a first sub-signaling and a second sub-signaling.

In one embodiment, the first sub-signaling comprises 1st-stage SCI, while the second sub-signaling comprises 2nd-stage SCI.

In one embodiment, a channel occupied by the first sub-signaling comprises a PSCCH, while a channel occupied by the second sub-signaling comprises a PSSCH.

In one embodiment, the first signaling comprises one or more fields in a piece of Downlink Control Information (DCI).

In one embodiment, the first signaling comprises all or part of a Higher Layer signaling.

In one embodiment, the first signaling is semi-statically configured.

In one embodiment, the first signaling is dynamically configured.

In one embodiment, the first signaling comprises one or more fields in a Configured Grant.

In one embodiment, the first signaling is the Configured Grant.

In one embodiment, the definition of the Configured Grant is given in 3GPP TS38.214, Section 6.1.2.3.

In one embodiment, the first signaling comprises the first identifier and the first priority.

In one embodiment, the first signaling comprises a positive integer number of first-type field(s), the first priority being one of the positive integer number of first-type field(s).

In one embodiment, the first signaling comprises a positive integer number of first-type field(s), the first identifier being one of the positive integer number of first-type field(s).

In one embodiment, the first sub-signaling comprises the first identifier and the first priority.

In one embodiment, the first sub-signaling comprises a positive integer number of third-type field(s), the first priority being one of the positive integer number of third-type field(s).

In one embodiment, the first sub-signaling comprises a positive integer number of third-type field(s), the first identifier being one of the positive integer number of third-type field(s).

In one embodiment, the first identifier is used for scrambling the first signaling.

In one embodiment, the first signaling comprises a reference time-frequency resource set.

In one embodiment, the first signaling explicitly indicates the second time-frequency resource set.

In one embodiment, the first signaling implicitly indicates the second time-frequency resource set.

In one embodiment, the first signaling indicates time-domain resources comprised in the reference time-frequency resource set.

In one embodiment, the first signaling indicates frequency-domain resources comprised in the reference time-frequency resource set.

In one embodiment, the first signaling indicates time-frequency resources comprised in the reference time-frequency resource set.

In one embodiment, the first signaling indicates sub-channel(s) comprised in the reference time-frequency resource set.

In one embodiment, the first signaling indicates Physical Resource Block(s) (PRB(s)) comprised in the reference time-frequency resource set.

In one embodiment, the first signaling indicates slot(s) comprised in the reference time-frequency resource set.

In one embodiment, the first signaling indicates multicarrier symbol(s) comprised in the reference time-frequency resource set.

In one embodiment, the first signaling indicates sub-channel(s) comprised in the reference time-frequency resource set and slot(s) comprised in the reference time-frequency resource set.

In one embodiment, the first signaling indicates PRB(s) comprised in the reference time-frequency resource set and multicarrier symbol(s) comprised in the reference time-frequency resource set.

In one embodiment, a channel occupied by the second signaling comprises a PSCCH.

In one embodiment, a channel occupied by the second signaling comprises a PSSCH.

In one embodiment, a channel occupied by the first signaling comprises a PSCCH, while a channel occupied by the second signaling comprises a PSCCH.

In one embodiment, a channel occupied by the first signaling comprises a PSSCH, while a channel occupied by the second signaling comprises a PSSCH.

In one embodiment, a channel occupied by the first signaling comprises a PDCCH, while a channel occupied by the second signaling comprises a Physical Uplink Control Channel (PUCCH).

In one embodiment, the second signaling is broadcast.

In one embodiment, the second signaling is groupcast.

In one embodiment, the second signaling is unicast.

In one embodiment, the second signaling is UE-Specific.

In one embodiment, the second signaling comprises one or more fields in an SCI.

In one embodiment, the second signaling is SCI.

In one embodiment, the second signaling comprises 1st-stage SCI.

In one embodiment, the second signaling comprises 2nd-stage SCI.

In one embodiment, the second signaling comprises 1st-stage SCI and 2nd-stage SCI.

In one embodiment, the second signaling comprises a third sub-signaling and a fourth sub-signaling.

In one embodiment, the third sub-signaling comprises 1st-stage SCI, while the fourth sub-signaling comprises 2nd-stage SCI.

In one embodiment, a channel occupied by the third sub-signaling comprises a PSCCH, while a channel occupied by the fourth sub-signaling comprises a PSSCH.

In one embodiment, the second signaling comprises all or part of a Higher Layer signaling.

In one embodiment, the second signaling is semi-statically configured.

In one embodiment, the second signaling is dynamically configured.

In one embodiment, the second signaling comprises one or more fields in a Configured Grant.

In one embodiment, the second signaling is the Configured Grant.

In one embodiment, the second signaling comprises the second identifier and the second priority.

In one embodiment, the second signaling comprises a positive integer number of second-type field(s), the second priority being one of the positive integer number of second-type field(s).

In one embodiment, the second signaling comprises a positive integer number of second-type field(s), the second identifier being one of the positive integer number of second-type field(s).

In one embodiment, the third sub-signaling comprises the second identifier and the second priority.

In one embodiment, the third sub-signaling comprises a positive integer number of fourth-type field(s), the second priority being one of the positive integer number of fourth-type field(s).

In one embodiment, the third sub-signaling comprises a positive integer number of fourth-type field(s), the second identifier being one of the positive integer number of fourth-type field(s).

In one embodiment, the second priority and the second identifier are respectively two different fourth-type fields in the third sub-signaling.

In one embodiment, the first sub-signaling comprises the first identifier and the first priority, while the third sub-signaling comprises the second identifier and the second priority.

In one embodiment, the third sub-signaling comprises the second priority, while the fourth sub-signaling comprises the second identifier.

In one embodiment, the fourth sub-signaling comprises a positive integer number of fifth-type field(s), the second identifier being one of the positive integer number of fifth-type field(s).

In one embodiment, the second priority is a fourth-type field in the third sub-signaling, and the second identifier is a fifth-type field in the fourth sub-signaling.

In one embodiment, the first sub-signaling comprises the first identifier and the first priority, the third sub-signaling comprises the second priority, and the fourth sub-signaling comprises the second identifier.

In one embodiment, the second identifier is used for scrambling the second signaling.

In one embodiment, the second signaling comprises a second time-frequency resource set.

In one embodiment, the second signaling explicitly indicates the second time-frequency resource set.

In one embodiment, the second signaling implicitly indicates the second time-frequency resource set.

In one embodiment, the second signaling indicates time-domain resources comprised in the second time-frequency resource set.

In one embodiment, the second signaling indicates frequency-domain resources comprised in the second time-frequency resource set.

In one embodiment, the second signaling indicates time-frequency resources comprised in the second time-frequency resource set.

In one embodiment, the second signaling indicates sub-channel(s) comprised in the second time-frequency resource set.

In one embodiment, the second signaling indicates slot(s) comprised in the second time-frequency resource set.

In one embodiment, the second signaling indicates sub-channel(s) occupied by the second time-frequency resource set and slot(s) occupied by the second time-frequency resource set.

In one embodiment, the second time-frequency resource set is reserved for a PSSCH.

In one embodiment, the second time-frequency resource set comprises multiple Resource Elements (REs).

In one embodiment, the second time-frequency resource set comprises a positive integer number of PRB(s).

In one embodiment, the second time-frequency resource set comprises a positive integer number of sub-channel(s).

In one embodiment, the second time-frequency resource set comprises a positive integer number of slot(s).

In one embodiment, the second time-frequency resource set comprises a positive integer number of multicarrier symbol(s).

In one embodiment, the second time-frequency resource set comprises a positive integer number of time-frequency resource unit(s).

In one embodiment, the second time-frequency resource set comprises a positive integer number of time-domain resource unit(s).

In one embodiment, the second time-frequency resource set comprises a positive integer number of frequency-domain resource unit(s).

In one embodiment, time-domain resources comprised in the second time-frequency resource set are a positive integer number of time-domain resource unit(s).

In one embodiment, frequency-domain resources comprised in the second time-frequency resource set are a positive integer number of frequency-domain resource unit(s).

In one embodiment, time-frequency resources comprised in the second time-frequency resource set are a positive integer number of time-frequency resource unit(s).

In one embodiment, the positive integer number of frequency-domain resource unit(s) in the second time-frequency resource set is(are) contiguous in frequency domain.

In one embodiment, the second time-frequency resource set comprises a PSCCH.

In one embodiment, the second time-frequency resource set comprises a PSSCH.

In one embodiment, the second time-frequency resource set comprises a PUCCH.

In one embodiment, the second time-frequency resource set comprises a PUSCH.

In one embodiment, the second time-frequency resource set belongs to the target resource sub-pool.

In one embodiment, the target resource sub-pool comprises the second time-frequency resource set.

In one embodiment, the target resource sub-pool comprises Q1 first-type time-frequency resource set(s), and the second time-frequency resource set is one of the Q1 first-type time-frequency resource set(s), where Q1 is a positive integer.

In one embodiment, the first signal is transmitted through a Sidelink Shared Channel (SL-SCH).

In one embodiment, a channel occupied by the first signal comprises a PSSCH.

In one embodiment, a channel occupied by the first signal comprises a PSCCH and a PSSCH.

In one embodiment, a channel occupied by the first signal comprises a PUSCH.

In one embodiment, the first signal is Cell-Specific.

In one embodiment, the first signal is UE-Specific.

In one embodiment, the first signal comprises a first bit block set, the first bit block set comprising a positive integer number of first-type bit block(s), among which any first-type bit block comprises a positive integer number of bit(s).

In one subembodiment, the first-type bit block comprises one Code Block (CB).

In one subembodiment, the first-type bit block comprises one Code Block Group (CBG).

In one subembodiment, the first-type bit block comprises one Transport Block (TB).

In one embodiment, the first signal is obtained by all or part of bits in the first bit block set sequentially through TB-level CRC Attachment, Code Block Segmentation, CB-level CRC Attachment, Channel Coding, Rate matching, Code Block Concatenation, Scrambling, and Modulation, Layer Mapping, Antenna Port Mapping, Mapping to Physical Resource Blocks and Baseband Signal Generation, and Modulation and Up conversion.

In one embodiment, the first signal is an output by the first bit block set sequentially through a Modulation Mapper, a Layer Mapper, Precoding, a Resource Element Mapper and Multicarrier Symbol Generation.

In one embodiment, the first signal comprises a DeModulation Reference Signal (DMRS).

In one embodiment, the first signal comprises a Channel State Information-Reference Signal (CSI-RS).

In one embodiment, the phrase that "a first time-frequency resource set is related to the reference time-frequency resource set" means that the reference time-frequency resource set is used to determine a reference radio resource set, while the first time-frequency resource set is used to determine a first radio resource set; time-domain resources comprised in the reference radio resource set and time-domain resources comprised in the first radio resource set are non-orthogonal.

In one embodiment, the phrase that "a first time-frequency resource set is related to the reference time-frequency resource set" means that the reference time-frequency resource set is used to determine a reference radio resource set, while the first time-frequency resource set is used to determine a first radio resource set; time-domain resources comprised in the reference radio resource set and time-domain resources comprised in the first radio resource set are overlapping.

In one embodiment, the phrase that "a first time-frequency resource set is related to the reference time-frequency resource set" means that the reference time-frequency resource set is used to determine a reference radio resource set, while the first time-frequency resource set is used to determine a first radio resource set; time-domain resources comprised in the reference radio resource set and time-domain resources comprised in the first radio resource set are the same.

In one embodiment, the phrase that "a first time-frequency resource set is related to the reference time-frequency resource set" means that time-domain resources comprised in the reference time-frequency resource set belong to a first time window, and time-domain resources comprised in the first time-frequency resource set belong to the first time window.

Embodiment 2

Figure 2:
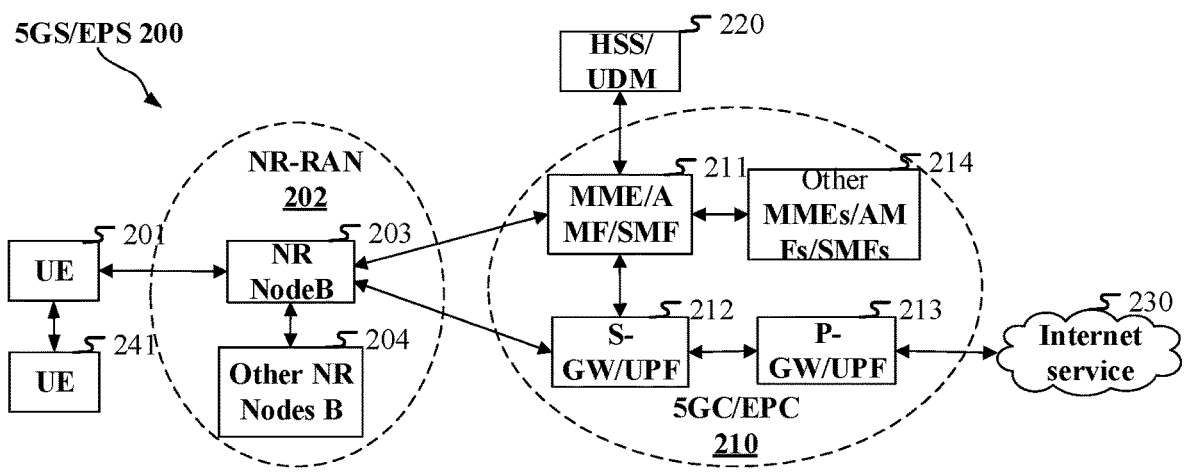
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called a 5GSystem/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/UserPlane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/ UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present disclosure includes the UE 201.

In one embodiment, the second node in the present disclosure includes the UE 241.

In one embodiment, the UE in the present disclosure includes the UE 201.

In one embodiment, the UE in the present disclosure includes the UE 241.

In one embodiment, the UE 201 supports sidelink transmission.

In one embodiment, the UE 241 supports sidelink transmission.

In one embodiment, a receiver for the first radio signal in the present disclosure includes the UE 201.

In one embodiment, a transmitter for the first radio signal in the present disclosure includes the UE 241.

In one embodiment, a transmitter for the second signal in the present disclosure includes the UE 201.

In one embodiment, a receiver for the second signal in the present disclosure includes the UE 241.

In one embodiment, a receiver for the first information in the present disclosure includes the UE 201.

In one embodiment, a transmitter for the first information in the present disclosure includes the UE 241.

In one embodiment, a transmitter for the first information in the present disclosure includes the gNB 203.

In one embodiment, a receiver for the second information in the present disclosure includes the UE 201.

In one embodiment, a transmitter for the second information in the present disclosure includes the UE 241.

In one embodiment, a transmitter for the second information in the present disclosure includes the gNB 203.

Embodiment 3

Figure 3:
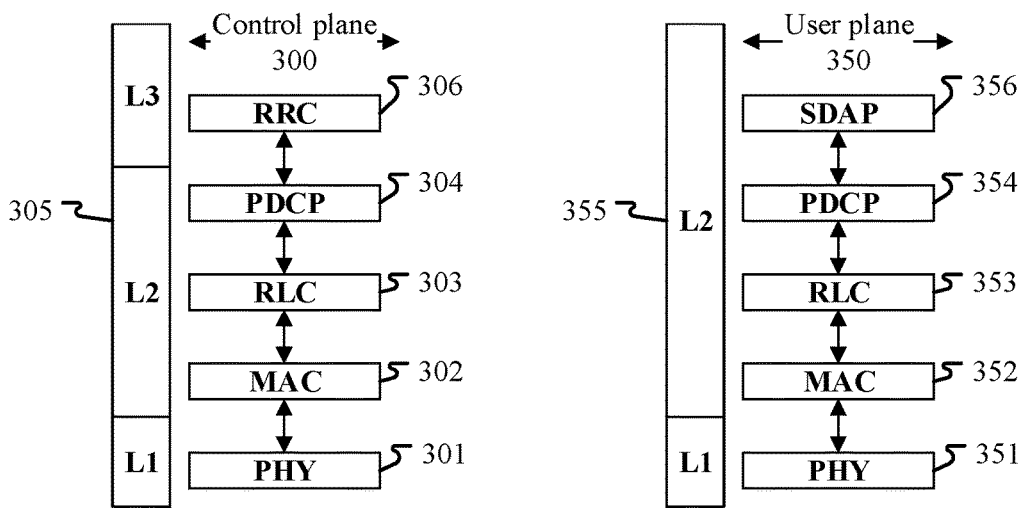
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first radio signal in the present disclosure is generated by the PHY 301.

In one embodiment, the first radio signal in the present disclosure is generated by the RRC sublayer 306.

In one embodiment, the first radio signal in the present disclosure is delivered by the MAC sublayer 302 to the PHY 301.

In one embodiment, the second signal in the present disclosure is generated by the PHY 301.

In one embodiment, the second signal in the present disclosure is generated by the MAC sublayer 302.

In one embodiment, the second signal in the present disclosure is generated by the RRC sublayer 306.

In one embodiment, the second signal in the present disclosure is delivered by the MAC sublayer 302 to the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

Embodiment 4

Figure 4:
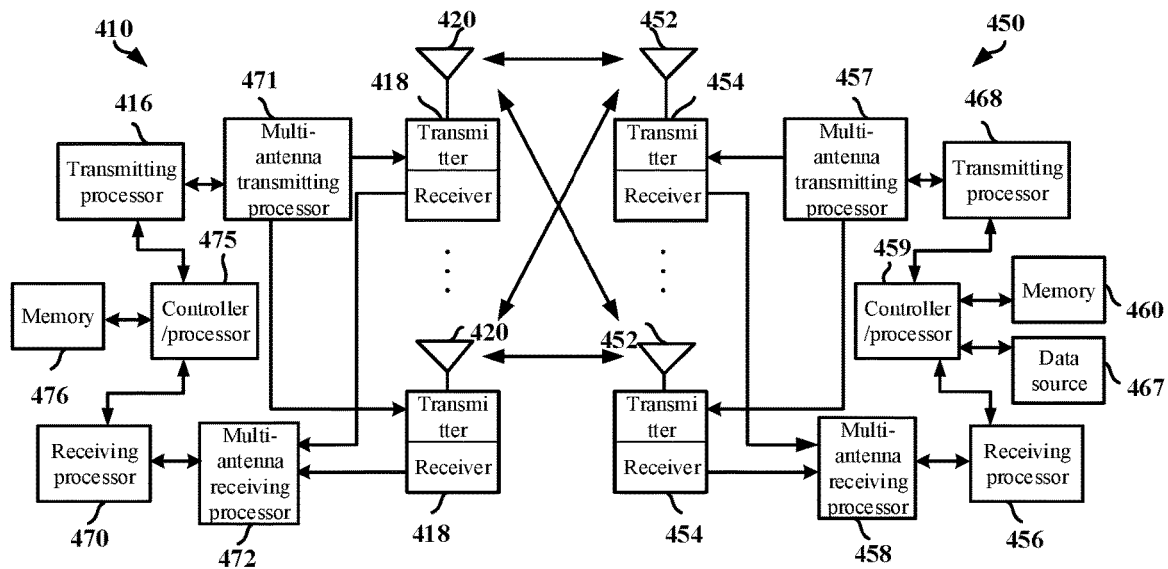
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the second communication device 450 comprises: at least one controller/processor; the at least one controller/processor is responsible for HARQ operation.

In one subembodiment, the first communication device 410 comprises: at least one controller/processor; the at least one controller/processor is responsible for HARQ operation.

In one subembodiment, the first communication device 410 comprises: at least one controller/processor; the at least one controller/processor is responsible for using ACK and/or NACK protocols for error checking as a way of supporting HARQ operation.

In one embodiment, the first node in the present disclosure comprises the second communication device 450, and the third node in the present disclosure comprises the first communication device 410.

In one subembodiment, the first node is a UE, and the third node is a relay node.

In one subembodiment, the first node is a UE, and the third node is a base station.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling, the first signaling being used to determine a first identifier and a first priority; transmits a second signaling, the second signaling being used to indicate a second identifier and a second priority; and transmits a first signal in a second time-frequency resource set, the second time-frequency resource set belonging to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

In one embodiment, the second communication device 450 comprises a memory that stores computer readable instruction program, the computer readable instruction program generates an action when executed by at least one processor, which includes: receiving a first signaling, the first signaling being used to determine a first identifier and a first priority; transmitting a second signaling, the second signaling being used to indicate a second identifier and a second priority; and transmitting a first signal in a second time-frequency resource set, the second time-frequency resource set belonging to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

In one embodiment, at least one of the antenna 452, the receiver 454, the multi-antenna receiving processor 458, the receiving processor 456, the controller/processor 459, the memory 460, or the data source 467 is used for receiving the first information in the present disclosure.

In one embodiment, at least one of the antenna 452, the receiver 454, the multi-antenna receiving processor 458, the receiving processor 456, the controller/processor 459, the memory 460, or the data source 467 is used for determining the first resource pool in the present disclosure.

In one embodiment, at least one of the antenna 452, the receiver 454, the multi-antenna receiving processor 458, the receiving processor 456, the controller/processor 459, the memory 460, or the data source 467 is used for monitoring the second signal in the present disclosure.

Embodiment 5

Figure 5:
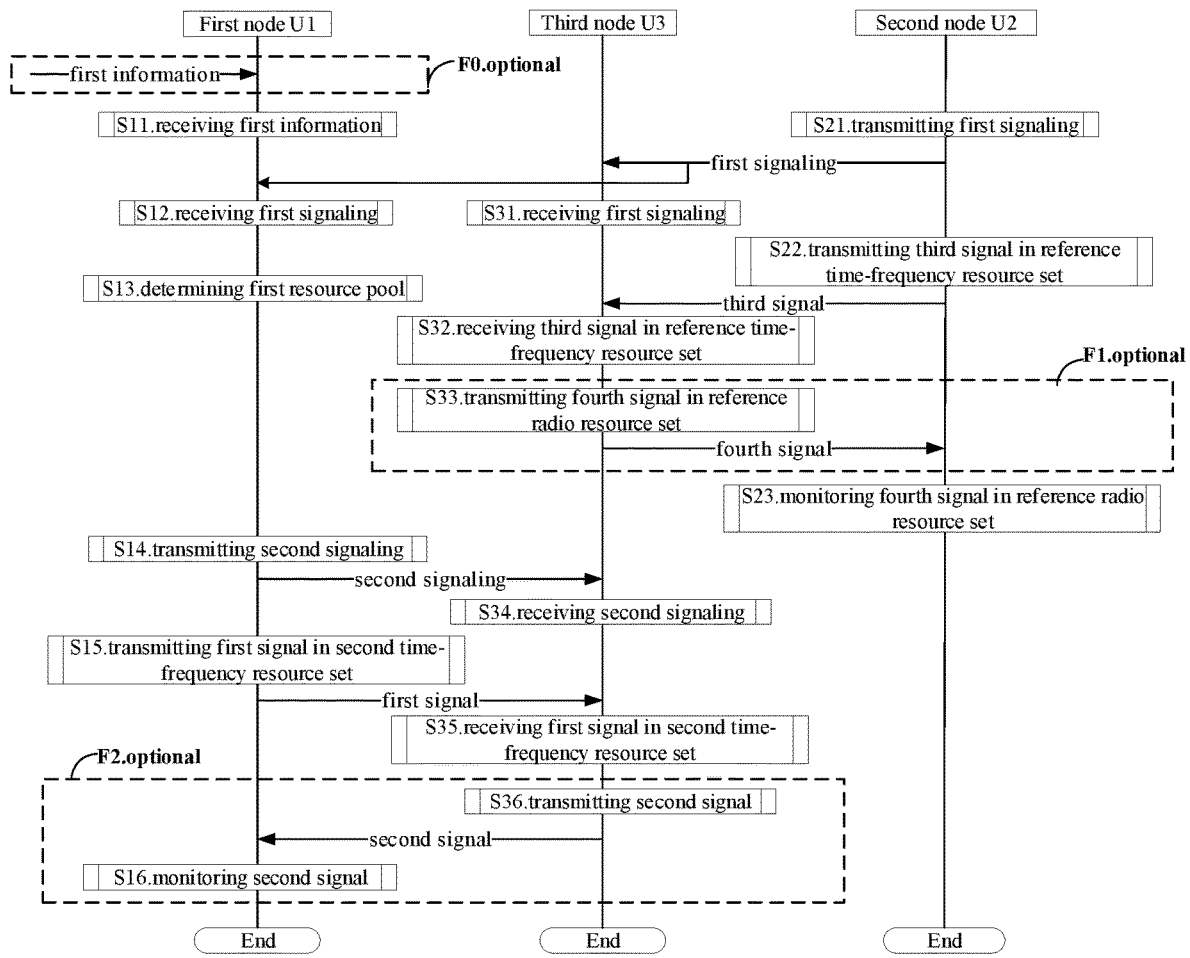
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1, a second node U2 and a third node U3 are in communications via an air interface. Steps marked by the box F0, the box F1 and the box F2 in FIG. 5 are optional, respectively.

The first node U1 receives first information in step S11; and receives a first signaling in step S12; determines a first resource pool in step S13; transmits a second signaling in step S14; transmits a first signal in a second time-frequency resource set in step S15; and monitors a second signal in step S16.

The second node U2 transmits a first signaling in step S21; transmits a third signal in a reference time-frequency resource set in step S22; and monitors a fourth signal in a reference radio resource set in step S23.

The third node U3 receives a first signaling in step S31; and receives a third signal in a reference time-frequency resource set in step S32; transmits a fourth signal in a reference radio resource set in step S33; receives a second signal in step S34; receives a first signal in a second time-frequency resource set in step S35; and transmits a second signal in step S36.

In Embodiment 5, the first signaling being used to determine a first identifier and a first priority; the second signaling being used to indicate a second identifier and a second priority; the second time-frequency resource set belonging to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool; the reference time-frequency resource set is used to determine the reference radio resource set; the first information is used to determine a first time window, time-domain resources comprised in the reference time-frequency resource set belong to the first time window; the target resource sub-pool belongs to a candidate resource pool, and the first time-frequency resource set belongs to the candidate resource pool, the candidate resource pool belonging to the first resource pool; the second signal is used to determine whether the first signal is correctly received; the second time-frequency resource set is used to determine the second radio resource set.

In one embodiment, when the first information comes from a communication node other than the first node U1, steps marked by the box F0 in FIG. 5 exist.

In one embodiment, when the first information comes from a higher layer of the first node U1, steps marked by the box F0 in FIG. 5 do not exist.

In one embodiment, when the reference radio resource set is orthogonal with a second radio resource set in the present disclosure, the steps marked by the box F1 in FIG. 5 exist.

In one embodiment, when the reference radio resource set is orthogonal in time domain with a second radio resource set in the present disclosure, the steps marked by the box F1 in FIG. 5 exist.

In one embodiment, when the reference radio resource set is non-orthogonal with a second radio resource set in the present disclosure, the steps marked by the box F1 in FIG. 5 do not exist.

In one embodiment, when the reference radio resource set is non-orthogonal in time domain with a second radio resource set in the present disclosure, the steps marked by the box F1 in FIG. 5 do not exist.

In one embodiment, when a second radio resource set in the present disclosure is orthogonal with the reference radio resource set, the steps marked by the box F2 in FIG. 5 exist.

In one embodiment, when a second radio resource set in the present disclosure is orthogonal in time domain with the reference radio resource set, the steps marked by the box F2 in FIG. 5 exist.

In one embodiment, when a second radio resource set in the present disclosure is non-orthogonal with the reference radio resource set, the steps marked by the box F2 in FIG. 5 do not exist.

In one embodiment, when a second radio resource set in the present disclosure is non-orthogonal in time domain with the reference radio resource set, the steps marked by the box F2 in FIG. 5 do not exist.

In one embodiment, the first node U1 and the second node U2 are in communications via a PC5; the second node U2 and the third node U3 are in communications via a PC5.

In one embodiment, the first node U1 and the second node U2 are in communications via a Uu.

In one embodiment, the first time-frequency resource set is used to determine a first radio resource set; time-domain resources comprised in the reference radio resource set and time-domain resources comprised in the first radio resource set are non-orthogonal.

In one embodiment, time-domain resources comprised in the first time-frequency resource set belong to the first time window.

In one embodiment, a ratio of a number of time-frequency resource units comprised in the candidate resource pool to a number of time-frequency resource units comprised in the first resource pool is no less than a second threshold.

In one embodiment, a ratio of a number of time-frequency resource units comprised in the target resource sub-pool to a number of time-frequency resource units comprised in the first resource pool is no less than a third threshold.

In one embodiment, when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

In one embodiment, when the second signal is being transmitted, the second signal occupies the second radio resource set.

In one embodiment, when the first transmission node and the second transmission node are not the same, the first time-frequency resource set belongs to the target resource sub-pool.

In one embodiment, the first transmission node is the third node U3, and the second transmission node is a communication node other than the third node U3.

In one embodiment, the communication node other than the third node U3 includes a UE.

In one embodiment, the communication node other than the third node U3 includes a base station.

In one embodiment, the communication node other than the third node U3 includes a relay node.

In one embodiment, when the first transmission node and the second transmission node are the same, a high-low relationship between the first priority and the second priority is used to determine whether the first time-frequency resource set belongs to the target resource sub-pool.

In one embodiment, when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

In one embodiment, when the first transmission node and the second transmission node are the same, whether the first transmission node is the same as the first node is used to determine whether the first time-frequency resource set belongs to the target resource sub-pool.

In one embodiment, the first transmission node includes the third node U3.

In one embodiment, the second transmission node includes the third node U3.

In one embodiment, the first transmission node and the second transmission node are the third node U3.

In one embodiment, the first threshold is default.

In one embodiment, the first threshold is configurable.

In one embodiment, the second threshold is default.

In one embodiment, the second threshold is configurable.

In one embodiment, the third threshold is default.

In one embodiment, the third threshold is configurable.

In one embodiment, a target receiver for the first signaling and a target receiver for the second signaling are Co-located.

In one embodiment, a target receiver for the first signaling and a target receiver for the second signaling are a same UE.

In one embodiment, a target receiver for the first signaling and a target receiver for the second signaling are a same relay.

In one embodiment, a Backhaul Link between a target receiver for the first signaling and a target receiver for the second signaling is desirable (i.e., delay is negligible).

In one embodiment, a target receiver for the third signal and a target receiver for the first signal are Co-located.

In one embodiment, a target receiver for the third signal and a target receiver for the first signal are a third node U3 in the present disclosure.

In one embodiment, a target receiver for the first signaling and a transmitter for the second signal are Co-located.

In one embodiment, a target receiver for the first signaling and a transmitter for the second signal are a third node U3 in the present disclosure.

In one embodiment, a transmitter for the fourth signal and a transmitter for the second signal are Co-located.

In one embodiment, a transmitter for the fourth signal and a transmitter for the second signal are a third node U3 in the present disclosure.

In one embodiment, a target receiver for the first signaling is a third node U3 in the present disclosure, and a transmitter for the second signaling is a first node U1 in the present disclosure.

In one embodiment, a target receiver for the first signaling is a third node U3 in the present disclosure, and a transmitter for the first signal is a first node U1 in the present disclosure.

In one embodiment, a channel occupied by the third signal comprises a SL-SCH.

In one embodiment, a channel occupied by the third signal comprises a PSSCH.

In one embodiment, a channel occupied by the third signal comprises a PSCCH and a PSSCH.

In one embodiment, a channel occupied by the third signal comprises a PUSCH.

In one embodiment, the third signal comprises a third bit block set, the third bit block set comprising a positive integer number of third-type bit block(s), among which any third-type bit block comprises a positive integer number of bit(s).

In one subembodiment, the third-type bit block comprises one Code Block (CB).

In one subembodiment, the third-type bit block comprises one Code Block Group (CBG).

In one subembodiment, the third-type bit block comprises one Transport Block (TB).

In one embodiment, a channel occupied by the fourth signal comprises a Physical Sidelink Feedback Channel (PSFCH).

In one embodiment, the fourth signal comprises Sidelink Feedback Information (SFI).

In one embodiment, the fourth signal comprises Uplink control information (UCI).

In one embodiment, the fourth signal is transmitted by a Physical Sidelink Feedback Channel (PSFCH).

In one embodiment, the fourth signal is used for indicating whether the third signal is correctly received.

In one embodiment, the fourth signal indicates that the third signal is correctly received.

In one embodiment, the fourth signal indicates that the third signal is not correctly received.

Embodiment 6

Figure 6:
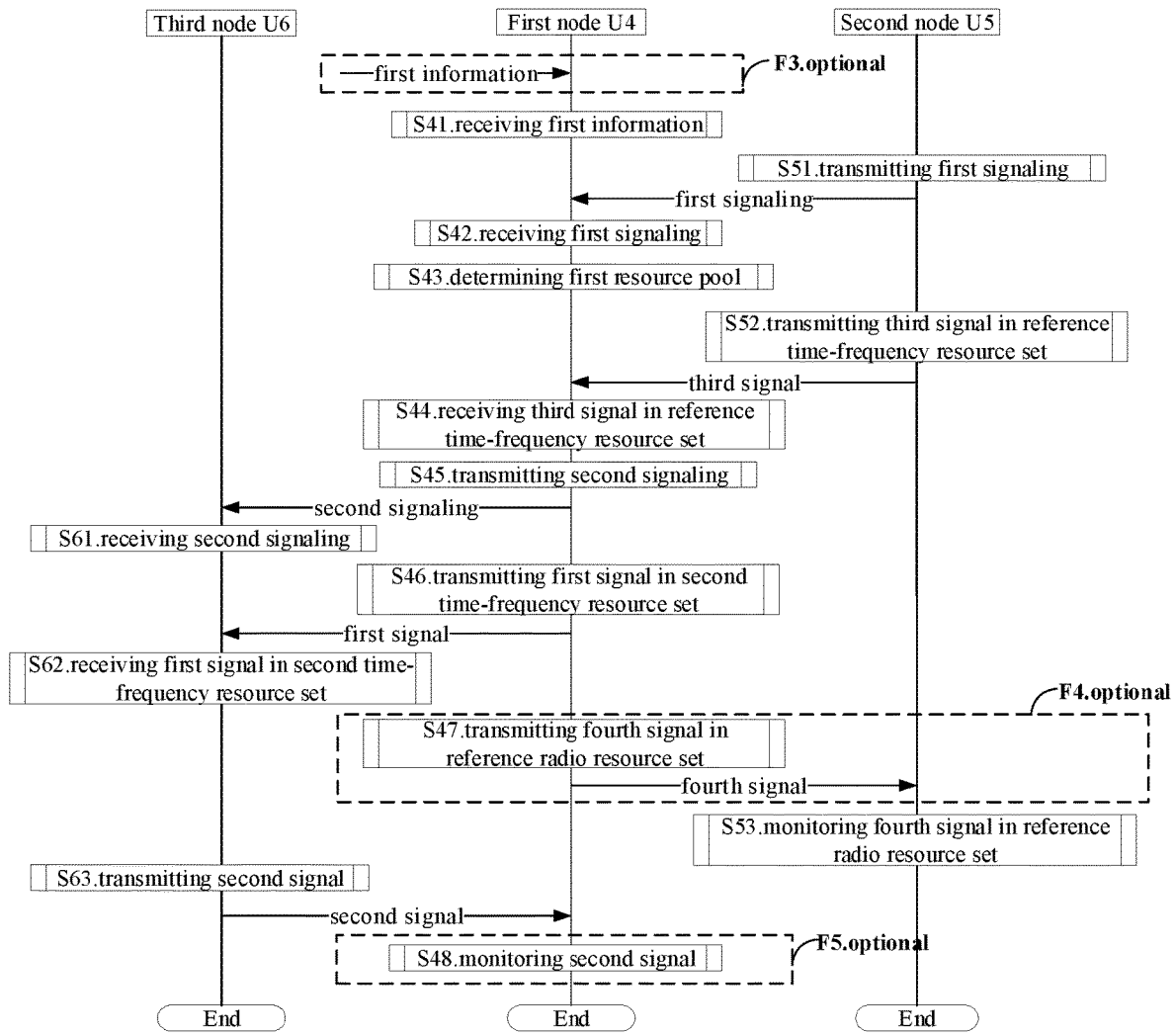
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a first node U4, a second node U5 and a third node U6 are in communications via an air interface.

The first node U4 receives first information in step S41; and receives a first signaling in step S42; determines a first resource pool in step S43; receives a third signal in a reference time-frequency resource set in step S44; transmits a second signaling in step S45; transmits a first signal in a second time-frequency resource set in step S46; transmits a fourth signal in a reference radio resource set in step S47; and monitors a second signal in step S48.

The second node U5 transmits a first signaling in step S51; transmits a third signal in a reference time-frequency resource set in step S52; and monitors a fourth signal in a reference radio resource set in step S53.

The third node U6 receives a second signaling in step S61; receives a first signal in a second time-frequency resource set in step S62; and transmits a second signal in step S63.

In Embodiment 6, the first signaling being used to determine a first identifier and a first priority; the second signaling being used to indicate a second identifier and a second priority; the second time-frequency resource set belonging to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool; the reference time-frequency resource set is used to determine the reference radio resource set; the first information is used to determine a first time window, time-domain resources comprised in the reference time-frequency resource set belong to the first time window; the target resource sub-pool belongs to a candidate resource pool, and the first time-frequency resource set belongs to the candidate resource pool, the candidate resource pool belonging to the first resource pool; the second signal is used to determine whether the first signal is correctly received; the second time-frequency resource set is used to determine the second radio resource set.

In one embodiment, the steps marked by the box F3 in FIG. 6 exist.

In one embodiment, the steps marked by the box F3 in FIG. 6 do not exist.

In one embodiment, when the first information comes from a communication node other than the first node U4, the steps marked by the box F3 in FIG. 6 exist.

In one embodiment, when the first information comes from a higher layer of the first node U4, steps marked by the box F3 in FIG. 6 do not exist.

In one embodiment, the steps marked by the box F4 in FIG. 6 exist.

In one embodiment, the steps marked by the box F4 in FIG. 6 do not exist.

In one embodiment, when the reference radio resource set is orthogonal with a second radio resource set in the present disclosure, the steps marked by the box F4 in FIG. 6 exist.

In one embodiment, when the reference radio resource set is orthogonal in time domain with a second radio resource set in the present disclosure, the steps marked by the box F4 in FIG. 6 exist.

In one embodiment, when the reference radio resource set is non-orthogonal with a second radio resource set in the present disclosure, the steps marked by the box F4 in FIG. 6 do not exist.

In one embodiment, when the reference radio resource set is non-orthogonal in time domain with a second radio resource set in the present disclosure, the steps marked by the box F4 in FIG. 6 do not exist.

In one embodiment, the steps marked by the box F5 in FIG. 6 exist.

In one embodiment, the steps marked by the box F5 in FIG. 6 do not exist.

In one embodiment, when a second radio resource set in the present disclosure is orthogonal with the reference radio resource set, the steps marked by the box F5 in FIG. 6 exist.

In one embodiment, when a second radio resource set in the present disclosure is orthogonal in time domain with the reference radio resource set, the steps marked by the box F5 in FIG. 6 exist.

In one embodiment, when a second radio resource set in the present disclosure is non-orthogonal with the reference radio resource set, the steps marked by the box F5 in FIG. 6 do not exist.

In one embodiment, when a second radio resource set in the present disclosure is non-orthogonal in time domain with the reference radio resource set, the steps marked by the box F5 in FIG. 6 do not exist.

In one embodiment, the first node U4 and the second node U5 are in communications via a PC5.

In one embodiment, the first node U5 and the second node U6 are in communications via a PC5.

In one embodiment, the first node U4 and the second node U6 are in communications via a PC5.

In one embodiment, the first node U4 and the second node U5 are in communications via a SL.

In one embodiment, the first node U5 and the second node U6 are in communications via a SL.

In one embodiment, the first node U4 and the second node U6 are in communications via a SL.

In one embodiment, the first time-frequency resource set is used to determine a first radio resource set; time-domain resources comprised in the reference radio resource set and time-domain resources comprised in the first radio resource set are non-orthogonal.

In one embodiment, time-domain resources comprised in the first time-frequency resource set belong to the first time window.

In one embodiment, a ratio of a number of time-frequency resource units comprised in the candidate resource pool to a number of time-frequency resource units comprised in the first resource pool is no less than a second threshold.

In one embodiment, a ratio of a number of time-frequency resource units comprised in the target resource sub-pool to a number of time-frequency resource units comprised in the first resource pool is no less than a third threshold.

In one embodiment, when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

In one embodiment, when the second signal is being transmitted, the second signal occupies the second radio resource set.

In one embodiment, when the first transmission node and the second transmission node are not the same, the first time-frequency resource set belongs to the target resource sub-pool.

In one embodiment, the first transmission node is a communication node other than the first node U4, and the second transmission node is the first node U4.

In one embodiment, the communication node other than the first node U4 includes a UE.

In one embodiment, the communication node other than the first node U4 includes a base station.

In one embodiment, the communication node other than the first node U4 includes a relay node.

In one embodiment, when the first transmission node and the second transmission node are the same, a high-low relationship between the first priority and the second priority is used to determine whether the first time-frequency resource set belongs to the target resource sub-pool.

In one embodiment, when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

In one embodiment, when the first transmission node and the second transmission node are the same, whether the first transmission node is the same as the first node is used to determine whether the first time-frequency resource set belongs to the target resource sub-pool.

In one embodiment, the first transmission node includes the first node U4.

In one embodiment, the second transmission node includes the first node U4.

In one embodiment, the first transmission node and the second transmission node are the first node U4.

In one embodiment, a target receiver for the first signaling and a transmitter for the second signaling are Co-located.

In one embodiment, a target receiver for the first signaling and a transmitter for the second signaling are a same communication node.

In one embodiment, a target receiver for the first signaling and a transmitter for the second signaling are a same UE.

In one embodiment, a target receiver for the first signaling and a transmitter for the second signaling are a same relay.

In one embodiment, a Backhaul Link between a target receiver for the first signaling and a transmitter for the second signaling is desirable (i.e., delay is negligible).

In one embodiment, a target receiver for the first signaling and a transmitter for the second signaling share a same set of baseband equipment.

In one embodiment, a target receiver for the first signaling and a transmitter for the second signaling are a first node U4 in the present disclosure.

In one embodiment, a target receiver for the first signaling and a transmitter for the first signal are Co-located.

In one embodiment, a target receiver for the first signaling and a transmitter for the first signal are a same communication node.

In one embodiment, a target receiver for the first signaling and a transmitter for the first signal are a same UE.

In one embodiment, a target receiver for the first signaling and a transmitter for the first signal are a same relay.

In one embodiment, a Backhaul Link between a target receiver for the first signaling and a transmitter for the first signal is desirable (i.e., delay is negligible).

In one embodiment, a target receiver for the first signaling and a transmitter for the first signal share a same set of baseband equipment.

In one embodiment, a target receiver for the first signaling and a transmitter for the first signal are a first node U4 in the present disclosure.

Embodiment 7

Figure 7:
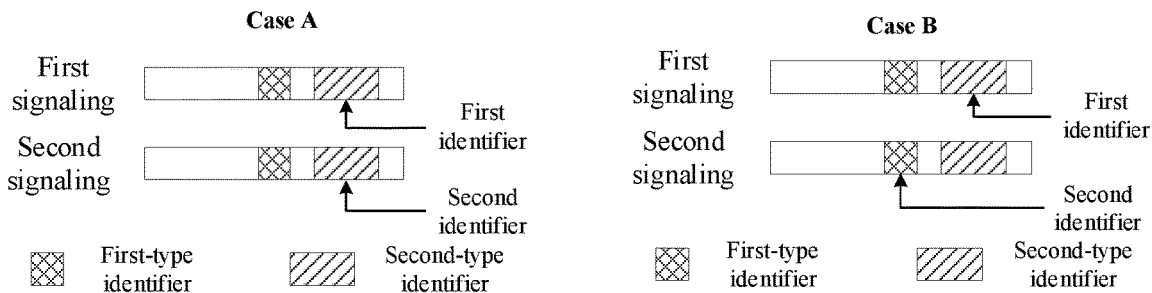
FIG. 7 illustrates a schematic diagram of a relationship between a first identifier and a second identifier according to one embodiment of the present disclosure.

Embodiment 7 illustrates a schematic diagram of a relationship between a first identifier and a second identifier according to one embodiment of the present disclosure, as shown in FIG. 7. In FIG. 7, the rectangle filled with oblique grids represents the first-type identifier in the present disclosure; the rectangle filled with oblique lines represents the second-type identifier in the present disclosure. In Case A of FIG. 7, the rectangle filled with oblique lines in a first signaling represents a first identifier in the present disclosure, while the rectangle filled with oblique lines in a second signaling represents a second identifier in the present disclosure. In Case B of FIG. 7, the rectangle filled with oblique lines in a first signaling represents a first identifier in the present disclosure, while the rectangle filled with oblique grids in a second signaling represents a second identifier in the present disclosure.

In Embodiment 7, the first signaling comprises a first identifier, and the second signaling comprises a second identifier; the first identifier is used for identifying a first transmission node, while the second identifier is used for identifying a second transmission node.

In one embodiment, the first identifier is one of X2 second-type identifiers, X2 being a positive integer.

In one embodiment, a number of bits comprised in the first identifier is configurable.

In one embodiment, a number of bits comprised in the second identifier is configurable.

In one embodiment, the X2 is a positive integer equal to a 16-th power of 2, where the first identifier comprises 16 bits.

In one embodiment, the second identifier is one of the X2 second-type identifiers.

In one embodiment, the second identifier comprises 16 bits.

In one embodiment, the second identifier is one of X1 first-type identifiers, X1 being a positive integer.

In one embodiment, the X1 is a positive integer equal to an 8-th power of 2, where the second identifier comprises 8 bits.

In one embodiment, the first identifier is one the X2 second-type identifiers, and the second identifier is one of the X2 second-type identifiers.

In one embodiment, the first identifier is one the X2 second-type identifiers, and the second identifier is one of the X1 first-type identifiers.

In one embodiment, the first identifier comprises 16 bits, while the second identifier comprises 16 bits.

In one embodiment, the first identifier comprises 16 bits, while the second identifier comprises 8 bits.

In one embodiment, any of the X1 first-type identifiers is used for identifying a transmitter for radio signals.

In one embodiment, any of the X1 first-type identifiers comprises a Source Identity (Source ID).

In one embodiment, any of the X1 first-type identifiers comprises a Layer-1 source ID.

In one embodiment, any of the X1 first-type identifiers is a non-negative integer.

In one embodiment, any of the X1 first-type identifiers is indicated by Y1 binary bits.

In one subembodiment, Y1 is equal to 8.

In one embodiment, any of the X2 second-type identifiers is used for identifying a target receiver for radio signals.

In one embodiment, any of the X2 second-type identifiers comprises a Destination Identity (Destination ID).

In one embodiment, any of the X2 second-type identifiers comprises a Layer-1 destination ID.

In one embodiment, any of the X2 second-type identifiers is a non-negative integer.

In one embodiment, any of the X2 second-type identifiers is indicated by Y2 binary bits.

In one subembodiment, Y2 is equal to 16.

In one embodiment, the first identifier is used for identifying a first transmission node.

In one embodiment, the second identifier is used for identifying a second transmission node.

In one embodiment, the first identifier is used for identifying a first UE group, the first UE group comprising a positive integer number of UEs, with the first transmission node being a UE in the first UE group.

In one embodiment, the second identifier is used for identifying a second UE group, the second UE group comprising a positive integer number of UEs, with the second transmission node being a UE in the second UE group.

In one embodiment, the first identifier comprises a Radio Network Temporary Identifier (RNTI).

In one embodiment, the first identifier comprises a Cell-Radio Network Temporary Identifier (C-RNTI).

In one embodiment, the first identifier comprises a Temporary Cell-Radio Network Temporary Identifier (TC-RNTI).

In one embodiment, the first identifier comprises an International Mobile Subscriber Identifier (IMSI).

In one embodiment, the first identifier is used for identifying a sequence of radio signals.

In one embodiment, the first identifier is used for generating a scrambling sequence for scrambling radio signals.

In one embodiment, the first identifier is configured by a higher layer signaling.

In one embodiment, the first identifier is configured by a physical layer (PHY) signaling.

In one embodiment, the second identifier is an RNTI.

In one embodiment, the second identifier is a C-RNTI.

In one embodiment, the second identifier comprises a TC-RNTI.

In one embodiment, the second identifier comprises an IMSI.

In one embodiment, the second identifier is used for identifying a sequence of radio signals.

In one embodiment, the second identifier is used for generating a scrambling sequence for scrambling radio signals.

In one embodiment, the second identifier is configured by a higher layer signaling.

In one embodiment, the second identifier is dynamically configured.

Embodiment 8

Figure 8:
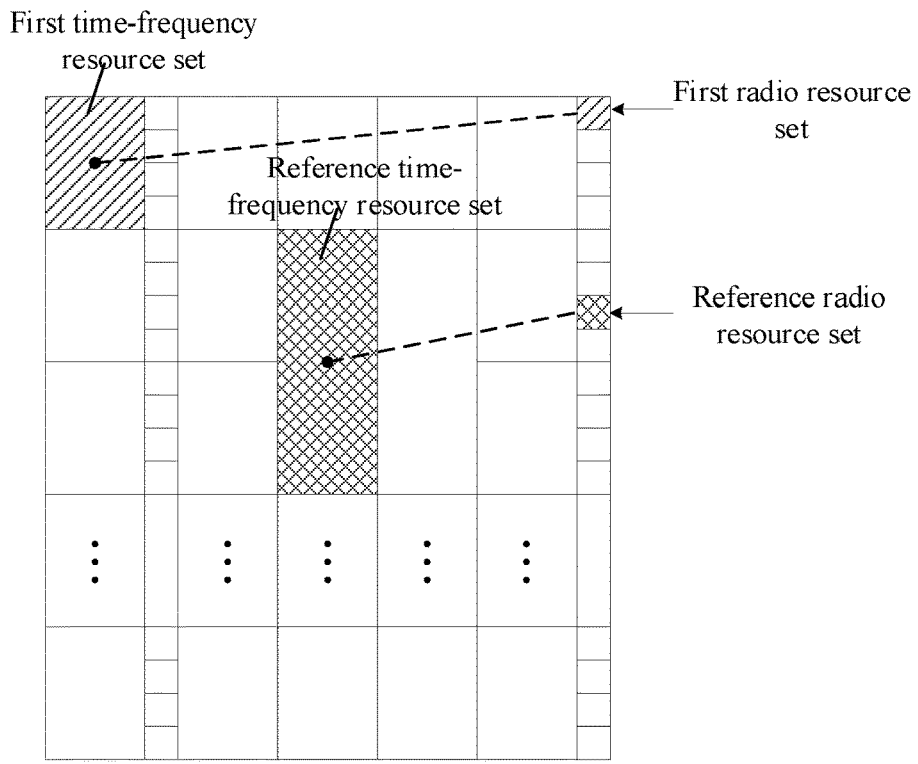
FIG. 8 illustrates a schematic diagram of a relationship between a reference time-frequency resource set and a first time-frequency resource set according to one embodiment of the present disclosure.

Embodiment 8 illustrates a schematic diagram of a relationship between a reference time-frequency resource set and a first time-frequency resource set according to one embodiment of the present disclosure, as shown in FIG. 8. In FIG. 8, the rectangle filled with oblique lines represents the first time-frequency resource unit in the present disclosure; the rectangle filled with oblique grids represents the reference time-frequency resource set in the present disclosure; the square filled with oblique lines represents a first radio resource set in the present disclosure; the square filled with oblique grids represents a reference radio resource set in the present disclosure.

In Embodiment 8, the reference time-frequency resource set is used to determine a reference radio resource set, the first time-frequency resource set is used to determine a first radio resource set; time-domain resources comprised in the reference radio resource set and time-domain resources comprised in the first radio resource set are non-orthogonal.

In one embodiment, the reference time-frequency resource set is used for SL transmission.

In one embodiment, the reference time-frequency resource set comprises multiple REs.

In one embodiment, the reference time-frequency resource set comprises a positive integer number of PRB(s).

In one embodiment, the reference time-frequency resource set comprises a positive integer number of sub-channel(s).

In one embodiment, the reference time-frequency resource set comprises a positive integer number of slot(s).

In one embodiment, the reference time-frequency resource set comprises a positive integer number of multi-carrier symbol(s).

In one embodiment, the reference time-frequency resource set comprises a positive integer number of time-frequency resource unit(s).

In one embodiment, the reference time-frequency resource set comprises a positive integer number of time-domain resource unit(s).

In one embodiment, the reference time-frequency resource set comprises a positive integer number of frequency-domain resource unit(s).

In one embodiment, time-domain resources comprised in the reference time-frequency resource set are a positive integer number of time-domain resource unit(s).

In one embodiment, frequency-domain resources comprised in the reference time-frequency resource set are a positive integer number of frequency-domain resource unit(s).

In one embodiment, time-frequency resources comprised in the reference time-frequency resource set are a positive integer number of time-frequency resource unit(s).

In one embodiment, a positive integer number of frequency-domain resource units comprised in the reference time-frequency resource set are consecutive in frequency domain.

In one embodiment, the reference time-frequency resource set comprises a PSCCH.

In one embodiment, the reference time-frequency resource set comprises a PSSCH.

In one embodiment, the reference time-frequency resource set comprises a PUCCH.

In one embodiment, the reference time-frequency resource set comprises a PUSCH.

In one embodiment, the target resource sub-pool does not comprise the reference time-frequency resource set.

In one embodiment, the target resource sub-pool comprises Q1 first-type time-frequency resource set(s), and the reference time-frequency resource set is different from any of the Q1 first-type time-frequency resource set(s).

In one embodiment, the candidate resource pool does not comprise the reference time-frequency resource set.

In one embodiment, the candidate resource pool comprises Q2 first-type time-frequency resource set(s), and the reference time-frequency resource set is different from any of the Q2 first-type time-frequency resource set(s), where Q2 is a positive integer.

In one embodiment, the first resource pool does not comprise the reference time-frequency resource set.

In one embodiment, the first resource pool comprises Q3 first-type time-frequency resource set(s), and the reference time-frequency resource set is different from any of the Q3 first-type time-frequency resource set(s), where Q3 is a positive integer.

In one embodiment, the first time-frequency resource set is used for SL transmission.

In one embodiment, the first time-frequency resource set comprises multiple REs.

In one embodiment, the first time-frequency resource set comprises a positive integer number of PRB(s).

In one embodiment, the first time-frequency resource set comprises a positive integer number of sub-channel(s).

In one embodiment, the first time-frequency resource set comprises a positive integer number of slot(s).

In one embodiment, the first time-frequency resource set comprises a positive integer number of multicarrier symbol(s).

In one embodiment, the first time-frequency resource set comprises a positive integer number of time-frequency resource unit(s).

In one embodiment, the first time-frequency resource set comprises a positive integer number of time-domain resource unit(s).

In one embodiment, the first time-frequency resource set comprises a positive integer number of frequency-domain resource unit(s).

In one embodiment, time-domain resources comprised in the first time-frequency resource set are a positive integer number of time-domain resource unit(s).

In one embodiment, frequency-domain resources comprised in the first time-frequency resource set are a positive integer number of frequency-domain resource unit(s).

In one embodiment, time-frequency resources comprised in the first time-frequency resource set are a positive integer number of time-frequency resource unit(s).

In one embodiment, a positive integer number of frequency-domain resource units comprised in the first time-frequency resource set are consecutive in frequency domain.

In one embodiment, the first time-frequency resource set comprises a PSCCH.

In one embodiment, the first time-frequency resource set comprises a PSSCH.

In one embodiment, the first time-frequency resource set comprises a PUCCH.

In one embodiment, the first time-frequency resource set comprises a PUSCH.

In one embodiment, the reference radio resource set comprises a positive integer number of time-frequency resource unit(s).

In one embodiment, the reference radio resource set comprises a positive integer number of time-domain resource unit(s).

In one embodiment, the reference radio resource set comprises a positive integer number of frequency-domain resource unit(s).

In one embodiment, the reference radio resource set comprises a positive integer number of code-domain resource unit(s).

In one embodiment, any of the positive integer number of code-domain resource unit(s) is a Pseudo-Random Sequence.

In one embodiment, for generation of the Pseudo-Random Sequence, refer to 3GPP TS38.211, Section 5.2.1.

In one embodiment, any of the positive integer number of code-domain resource unit(s) is a Low-PAPR (i.e., Low-Peak to Average Power Ratio) Sequence.

In one embodiment, for generation of the Low-PAPR Sequence, refer to 3GPP TS38.211, Section 5.2.2.

In one embodiment, any of the positive integer number of code-domain resource unit(s) is a Base Sequence.

In one embodiment, any of the positive integer number of code-domain resource unit(s) is a sequence after a cyclic shift.

In one embodiment, time-domain resources comprised in the reference radio resource set are a positive integer number of time-domain resource unit(s).

In one embodiment, frequency-domain resources comprised in the reference radio resource set are a positive integer number of frequency-domain resource unit(s).

In one embodiment, time-frequency resources comprised in the reference radio resource set are a positive integer number of time-frequency resource unit(s).

In one embodiment, code-domain resources comprised in the reference radio resource set are a positive integer number of code-domain resource unit(s).

In one embodiment, code-domain resources comprised in the reference radio resource set are a sequence generated after a Base Sequence through a positive integer number of cyclic shift(s).

In one embodiment, a positive integer number of Pseudo-Random Sequences comprised in the reference radio resource set are orthogonal.

In one embodiment, initial values of a positive integer number of Pseudo-Random Sequences comprised in the reference radio resource set are the same.

In one embodiment, initial values of a positive integer number of Pseudo-Random Sequences comprised in the reference radio resource set are mutually different.

In one embodiment, initial values of a positive integer number of Pseudo-Random Sequences comprised in the reference radio resource set are the same, but cyclic shifts of the positive integer number of Pseudo-Random Sequences are mutually different.

In one embodiment, the reference radio resource set comprises multiple REs.

In one embodiment, the reference radio resource set comprises a positive integer number of PRB(s).

In one embodiment, the reference radio resource set comprises a positive integer number of sub-channel(s).

In one embodiment, the reference radio resource set comprises a positive integer number of slot(s).

In one embodiment, the reference radio resource set comprises a positive integer number of multicarrier symbol(s).

In one embodiment, the reference radio resource set comprises a PSFCH.

In one embodiment, the reference radio resource set is a PSFCH.

In one embodiment, the reference time-frequency resource set is used to determine the reference radio resource set.

In one embodiment, time-domain resources comprised in the reference time-frequency resource set are used to determine the reference radio resource set.

In one embodiment, time-domain resources comprised in the reference time-frequency resource set are used to determine time-domain resources comprised in the reference radio resource set.

In one embodiment, time-domain resources comprised in the reference time-frequency resource set are used to determine frequency-domain resources comprised in the reference radio resource set.

In one embodiment, time-domain resources comprised in the reference time-frequency resource set are used to determine time-frequency resources comprised in the reference radio resource set.

In one embodiment, time-domain resources comprised in the reference time-frequency resource set are used to determine code-domain resources comprised in the reference radio resource set.

In one embodiment, time-domain resources comprised in the reference time-frequency resource set are used to determine frequency-domain resources comprised in the reference radio resource set and code-domain resources comprised in the reference radio resource set.

In one embodiment, slot(s) comprised in the reference time-frequency resource set is(are) used to determine PRB(s) comprised in the reference radio resource set.

In one embodiment, slot(s) comprised in the reference time-frequency resource set is(are) used to determine multicarrier symbol(s) comprised in the reference radio resource set.

In one embodiment, frequency-domain resources comprised in the reference time-frequency resource set are used to determine the reference radio resource set.

In one embodiment, frequency-domain resources comprised in the reference time-frequency resource set are used to determine frequency-domain resources comprised in the reference radio resource set.

In one embodiment, frequency-domain resources comprised in the reference time-frequency resource set are used to determine time-frequency resources comprised in the reference radio resource set.

In one embodiment, frequency-domain resources comprised in the reference time-frequency resource set are used to determine code-domain resources comprised in the reference radio resource set.

In one embodiment, frequency-domain resources comprised in the reference time-frequency resource set are used to determine frequency-domain resources comprised in the reference radio resource set and code-domain resources comprised in the reference radio resource set.

In one embodiment, sub-channel(s) comprised in the reference time-frequency resource set is(are) used to determine PRB(s) comprised in the reference radio resource set.

In one embodiment, sub-channel(s) comprised in the reference time-frequency resource set is(are) used to determine multicarrier symbol(s) comprised in the reference radio resource set.

In one embodiment, time-frequency resources comprised in the reference time-frequency resource set are used to determine the reference radio resource set.

In one embodiment, time-frequency resources comprised in the reference time-frequency resource set are used to determine code-domain resources comprised in the reference radio resource set.

In one embodiment, time-frequency resources comprised in the reference time-frequency resource set are used to determine frequency-domain resources comprised in the reference radio resource set and code-domain resources comprised in the reference radio resource set.

In one embodiment, the reference time-frequency resource set and the first identifier are jointly used to determine the reference radio resource set.

In one embodiment, time-domain resources comprised in the reference time-frequency resource set and the first identifier are jointly used to determine frequency-domain resources comprised in the reference radio resource set.

In one embodiment, time-domain resources comprised in the reference time-frequency resource set and the first identifier are jointly used to determine frequency-domain resources comprised in the reference radio resource set and code-domain resources comprised in the reference radio resource set.

In one embodiment, slot(s) comprised in the reference time-frequency resource set and the first identifier are jointly used to determine PRB(s) comprised in the reference radio resource set.

In one embodiment, slot(s) comprised in the reference time-frequency resource set and the first identifier are jointly used to determine multicarrier symbol(s) comprised in the reference radio resource set.

In one embodiment, sub-channel(s) comprised in the reference time-frequency resource set is(are) used to determine PRB(s) comprised in the reference radio resource set, and the first identifier is used to determine code-domain resources comprised in the reference radio resource set.

In one embodiment, sub-channel(s) comprised in the reference time-frequency resource set is(are) used to determine PRB(s) comprised in the reference radio resource set, and the first identifier is used to determine pseudo-random sequence(s) comprised in the reference radio resource set.

In one embodiment, the first radio resource set comprises a positive integer number of time-frequency resource unit(s).

In one embodiment, the first radio resource set comprises a positive integer number of time-domain resource unit(s).

In one embodiment, the first radio resource set comprises a positive integer number of frequency-domain resource unit(s).

In one embodiment, the first radio resource set comprises a positive integer number of code-domain resource unit(s).

In one embodiment, time-domain resources comprised in the first radio resource set are a positive integer number of time-domain resource unit(s).

In one embodiment, frequency-domain resources comprised in the first radio resource set are a positive integer number of frequency-domain resource unit(s).

In one embodiment, time-frequency resources comprised in the first radio resource set are a positive integer number of time-frequency resource unit(s).

In one embodiment, code-domain resources comprised in the first radio resource set are a positive integer number of code-domain resource unit(s).

In one embodiment, code-domain resources comprised in the first radio resource set are a sequence generated after a Base Sequence through a positive integer number of cyclic shift(s).

In one embodiment, a positive integer number of Pseudo-Random Sequences comprised in the first radio resource set are orthogonal.

In one embodiment, initial values of a positive integer number of Pseudo-Random Sequences comprised in the first radio resource set are the same.

In one embodiment, initial values of a positive integer number of Pseudo-Random Sequences comprised in the first radio resource set are mutually different.

In one embodiment, initial values of a positive integer number of Pseudo-Random Sequences comprised in the first radio resource set are the same, but cyclic shifts of the positive integer number of Pseudo-Random Sequences are mutually different.

In one embodiment, the first radio resource set comprises multiple REs.

In one embodiment, the first radio resource set comprises a positive integer number of PRB(s).

In one embodiment, the first radio resource set comprises a positive integer number of sub-channel(s).

In one embodiment, the first radio resource set comprises a positive integer number of slot(s).

In one embodiment, the first radio resource set comprises a positive integer number of multicarrier symbol(s).

In one embodiment, the first radio resource set comprises a PSFCH.

In one embodiment, the first radio resource set is a PSFCH.

In one embodiment, the first time-frequency resource set is used to determine the first radio resource set.

In one embodiment, time-domain resources comprised in the first time-frequency resource set are used to determine the first radio resource set.

In one embodiment, time-domain resources comprised in the first time-frequency resource set are used to determine time-domain resources comprised in the first radio resource set.

In one embodiment, time-domain resources comprised in the first time-frequency resource set are used to determine frequency-domain resources comprised in the first radio resource set.

In one embodiment, time-domain resources comprised in the first time-frequency resource set are used to determine time-frequency resources comprised in the first radio resource set.

In one embodiment, time-domain resources comprised in the first time-frequency resource set are used to determine code-domain resources comprised in the first radio resource set.

In one embodiment, time-domain resources comprised in the first time-frequency resource set are used to determine frequency-domain resources comprised in the first radio resource set and code-domain resources comprised in the first radio resource set.

In one embodiment, slot(s) comprised in the first time-frequency resource set is(are) used to determine PRB(s) comprised in the first radio resource set.

In one embodiment, slot(s) comprised in the first time-frequency resource set is(are) used to determine multicarrier symbol(s) comprised in the first radio resource set.

In one embodiment, frequency-domain resources comprised in the first time-frequency resource set are used to determine the first radio resource set.

In one embodiment, frequency-domain resources comprised in the first time-frequency resource set are used to determine frequency-domain resources comprised in the first radio resource set.

In one embodiment, frequency-domain resources comprised in the first time-frequency resource set are used to determine time-frequency resources comprised in the first radio resource set.

In one embodiment, frequency-domain resources comprised in the first time-frequency resource set are used to determine code-domain resources comprised in the first radio resource set.

In one embodiment, frequency-domain resources comprised in the first time-frequency resource set are used to determine frequency-domain resources comprised in the first radio resource set and code-domain resources comprised in the first radio resource set.

In one embodiment, sub-channel(s) comprised in the first time-frequency resource set is(are) used to determine PRB(s) comprised in the first radio resource set.

In one embodiment, sub-channel(s) comprised in the first time-frequency resource set is(are) used to determine multicarrier symbol(s) comprised in the first radio resource set.

In one embodiment, time-frequency resources comprised in the first time-frequency resource set are used to determine the first radio resource set.

In one embodiment, time-frequency resources comprised in the first time-frequency resource set are used to determine code-domain resources comprised in the first radio resource set.

In one embodiment, time-frequency resources comprised in the first time-frequency resource set are used to determine frequency-domain resources comprised in the first radio resource set and code-domain resources comprised in the first radio resource set.

In one embodiment, the first time-frequency resource set and the first identifier are jointly used to determine the first radio resource set.

In one embodiment, time-domain resources comprised in the first time-frequency resource set and the first identifier are jointly used to determine frequency-domain resources comprised in the reference radio resource set.

In one embodiment, time-domain resources comprised in the first time-frequency resource set and the first identifier are jointly used to determine frequency-domain resources comprised in the first radio resource set and code-domain resources comprised in the first radio resource set.

In one embodiment, slot(s) comprised in the first time-frequency resource set and the first identifier are jointly used to determine PRB(s) comprised in the first radio resource set.

In one embodiment, slot(s) comprised in the first time-frequency resource set and the first identifier are jointly used to determine multicarrier symbol(s) comprised in the first radio resource set.

In one embodiment, sub-channel(s) comprised in the first time-frequency resource set is(are) used to determine PRB(s) comprised in the first radio resource set, and the first identifier is used to determine code-domain resources comprised in the first radio resource set.

In one embodiment, time-domain resources comprised in the reference radio resource set and time-domain resources comprised in the first radio resource set are non-orthogonal.

In one embodiment, the reference radio resource set and the first radio resource set are non-orthogonal in time domain.

In one embodiment, the reference radio resource set and the first radio resource set are overlapping in time domain.

In one embodiment, the reference radio resource set and the first radio resource set are Frequency Division Multiplexing (FDM).

In one embodiment, the reference radio resource set and the first radio resource set are Code Division Multiplexing (CDM).

In one embodiment, the reference radio resource set and the first radio resource set occupy same time-domain resource units, but the reference radio resource set and the first radio resource set occupy different frequency-domain resource units.

In one embodiment, time-domain resources comprised in the reference radio resource set and time-domain resources comprised in the first radio resource set are the same, while frequency-domain resources comprised in the reference radio resource set and frequency-domain resources comprised in the first radio resource set are different.

In one embodiment, multicarrier symbols occupied by the reference radio resource set and multicarrier symbols occupied by the first radio resource set are the same, while sub-channels occupied by the reference radio resource set and sub-channels occupied by the first radio resource set are different.

In one embodiment, multicarrier symbols occupied by the reference radio resource set and multicarrier symbols occupied by the first radio resource set are the same, while PRBs occupied by the reference radio resource set and PRBs occupied by the first radio resource set are different.

In one embodiment, multicarrier symbols occupied by the reference radio resource set and multicarrier symbols occupied by the first radio resource set are the same, while subcarriers occupied by the reference radio resource set and subcarriers occupied by the first radio resource set are different.

In one embodiment, the reference radio resource set and the first radio resource set occupy same time-domain resource units, but the reference radio resource set and the first radio resource set occupy different code-domain resource units.

In one embodiment, time-domain resources comprised in the reference radio resource set and time-domain resources comprised in the first radio resource set are the same, while code-domain resources comprised in the reference radio resource set and code-domain resources comprised in the first radio resource set are different.

In one embodiment, multicarrier symbols occupied by the reference radio resource set and multicarrier symbols occupied by the first radio resource set are the same, while code-domain resource units occupied by the reference radio resource set and code-domain resource units occupied by the first radio resource set are different.

In one embodiment, multicarrier symbols occupied by the reference radio resource set and multicarrier symbols occupied by the first radio resource set are the same, while a pseudo-random sequence employed by the reference radio resource set and a pseudo-random sequence employed by the first radio resource set are different.

In one embodiment, multicarrier symbols occupied by the reference radio resource set and multicarrier symbols occupied by the first radio resource set are the same, while a Low-PAPR sequence employed by the reference radio resource set and a Low-PAPR sequence employed by the first radio resource set are different.

In one embodiment, multicarrier symbols occupied by the reference radio resource set and multicarrier symbols occupied by the first radio resource set are the same, while a base sequence employed by the reference radio resource set and a base sequence employed by the first radio resource set are different.

In one embodiment, multicarrier symbols occupied by the reference radio resource set and multicarrier symbols occupied by the first radio resource set are the same, while a cyclic shift for a base sequence employed by the reference radio resource set and a cyclic shift for a base sequence employed by the first radio resource set are different.

In one embodiment, the reference radio resource set comprises a first time-domain resource unit, the first radio resource set also comprises the first time-domain resource unit.

In one embodiment, the first time-domain resource unit is one of the positive integer number of time-domain resource unit(s) comprised in the reference radio resource set, and the first time-domain resource unit is one of the positive integer number of time-domain resource unit(s) comprised in the first radio resource set.

In one embodiment, the first time-domain resource unit comprises a positive integer number of multicarrier symbol(s).

In one embodiment, the first time-domain resource unit comprises a multicarrier symbol.

In one embodiment, the first time-domain resource unit comprises two multicarrier symbols.

In one embodiment, the first time-domain resource unit comprises a Slot.

Embodiment 9

Figure 9:
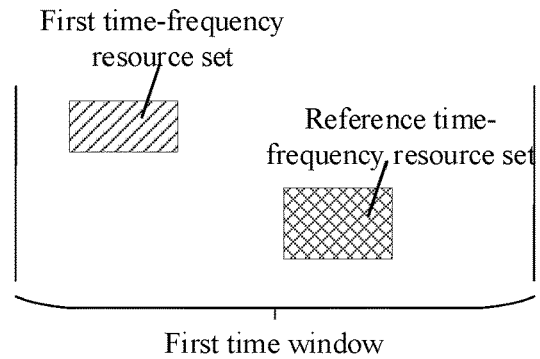
FIG. 9 illustrates a schematic diagram of a relationship between a reference time-frequency resource set and a first time-frequency resource set according to one embodiment of the present disclosure.

Embodiment 9 illustrates a schematic diagram of a relationship between a reference time-frequency resource set and a first time-frequency resource set according to one embodiment of the present disclosure, as shown in FIG. 9. In FIG. 9, the rectangle filled with oblique lines represents the first time-frequency resource set in the present disclosure; the rectangle filled with oblique grids represents the reference time-frequency resource set in the present disclosure; between two solid lines is a first time window in the present disclosure.

In Embodiment 9, the first information is used to determine a first time window, time-domain resources comprised in the reference time-frequency resource set belong to the first time window, and time-domain resources comprised in the first time-frequency resource set belong to the first time window.

In one embodiment, the first information is Cell-Specific.

In one embodiment, the first information is UE-Specific.

In one embodiment, a channel occupied by the first information comprises a PSSCH.

In one embodiment, a channel occupied by the first information comprises a PSCCH and a PSSCH.

In one embodiment, a channel occupied by the first information comprises a PDCCH and a PDSCH.

In one embodiment, the first information comprises all or part of a Higher Layer signaling.

In one embodiment, the first information comprises all or part of an RRC layer signaling.

In one embodiment, the first information comprises one or more fields in an RRC IE.

In one embodiment, the first information comprises one or more fields in a SIB.

In one embodiment, the first information comprises all or part of a MAC layer signaling.

In one embodiment, the first information comprises one or more fields in a MAC CE.

In one embodiment, the first information comprises one or more fields in a PHY layer signaling.

In one embodiment, the first information is semi-statically configured.

In one embodiment, the first information is dynamically configured.

In one embodiment, the first information is used to determine the first time window.

In one embodiment, the first information comprises the first time window.

In one embodiment, the first information comprises time-domain resources comprised in the first time window.

In one embodiment, the first information is used for indicating time-domain resource units comprised in the first time window.

In one embodiment, the first information comprises a number of time-domain resource units comprised in the first time window.

In one embodiment, the first information is used to indicate a start of the first time window.

In one embodiment, the first information comprises a positive integer number of first-type field(s), with a number of time-domain resource units comprised in the first time window being one of the positive integer number of first-type field(s).

In one embodiment, time-domain resources comprised in the first time window is one of the positive integer number of first-type field(s) comprised in the first information.

In one embodiment, the first time window comprises N time-domain resource unit(s), N being a positive integer.

In one subembodiment, N is equal to 1.
In one subembodiment, N is equal to 2.
In one subembodiment, N is equal to 4.
In one subembodiment, the first information block is used for indicating N.

In one embodiment, a time interval between an end of the first time window and a start of an earliest multicarrier symbol comprised by the first radio resource set in time domain is equal to a time length of X slot(s), where X is a positive integer; any of the X slot(s) is a slot comprised in a resource pool in Sidelink (SL).

In one subembodiment, X is equal to 1.
In one subembodiment, X is equal to 2.
In one subembodiment, X is equal to 3.

In one embodiment, time-domain resources comprised in the reference time-frequency resource set are one of the N time-domain resource unit(s) comprised in the first time window In one embodiment, time-domain resources comprised in the first time-frequency resource set are one of the N time-domain resource unit(s) comprised in the first time window.

In one embodiment, time-domain resources comprised in the reference time-frequency resource set are the same as time-domain resources comprised in the first time-frequency resource set.

In one embodiment, time-domain resources comprised in the reference time-frequency resource set are different from the time-domain resources comprised in the first time-frequency resource set.

Embodiment 10

Figure 10:
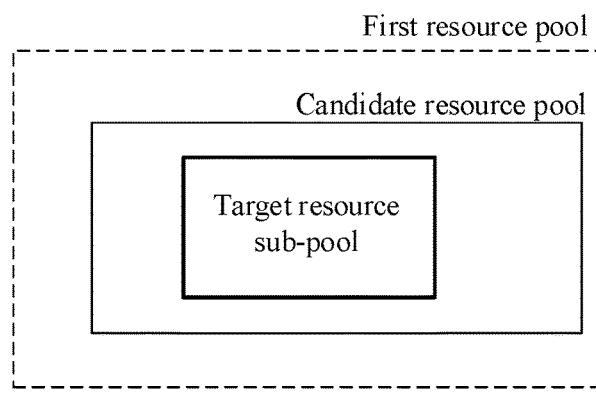
FIG. 10 illustrates a schematic diagram of relations between a target resource sub-pool, a candidate resource pool and a first resource pool according to one embodiment of the present disclosure.

Embodiment 10 illustrates a schematic diagram of relations between a target resource sub-pool, a candidate resource pool and a first resource pool according to one embodiment of the present disclosure, as shown in FIG. 10. In FIG. 10, the large broken-line box represents a first resource pool in the present disclosure; the solid-line box represents a candidate resource pool in the present disclosure; the thick-line box represents a target resource sub-pool in the present disclosure.

In Embodiment 10, the target resource sub-pool belongs to a candidate resource pool in the present disclosure; the candidate resource pool belongs to the first resource pool.

In one embodiment, the first resource pool comprises Q3 first-type time-frequency resource set(s), and any of the Q3 first-type time-frequency resource set(s) comprises a positive integer number of time-frequency resource unit(s), where Q3 is a positive integer.

In one embodiment, any of the Q3 first-type time-frequency resource set(s) comprised in the first resource pool comprises a positive integer number of consecutive sub-channels.

In one embodiment, any of the Q3 first-type time-frequency resource set(s) comprised in the first resource pool comprises a positive integer number of consecutive subcarriers.

In one embodiment, any of the Q3 first-type time-frequency resource set(s) comprised in the first resource pool belongs to a first Time Interval.

In one embodiment, a start time for the first Time Interval is autonomously selected by the first node.

In one embodiment, an end time for the first Time Interval is autonomously selected by the first node.

In one embodiment, time-domain resources for a packet arriving at a MAC layer and a first time offset are jointly used to determine a start of the first time interval.

In one embodiment, time-domain resources for a packet arriving at a MAC layer and a second time offset are jointly used to determine an end of the first time interval.

In one embodiment, time-domain resources for a packet arriving at a MAC layer comprises a slot.

In one embodiment, time-domain resources for a packet arriving at a MAC layer comprises a subframe.

In one embodiment, time-domain resources for a MAC layer demand-aware report and a first time offset are jointly used to determine a start of the first time interval.

In one embodiment, time-domain resources for a MAC layer demand-aware report and a second time offset are jointly used to determine an end of the first time interval.

In one embodiment, time-domain resources for a MAC layer demand-aware report comprises a slot.

In one embodiment, time-domain resources for a MAC layer demand-aware report comprises a subframe.

In one embodiment, the first time offset is autonomously selected by the first node.

In one embodiment, the second time offset is autonomously selected by the first node.

In one embodiment, the first time offset is measured in slot(s).

In one embodiment, the first time offset is measured in subframe(s).

In one embodiment, the second time offset is measured in slot(s).

In one embodiment, the second time offset is measured in subframe(s).

In one embodiment, the first time offset is a positive integer no greater than 4.

In one embodiment, the second time offset is a positive integer no greater than 100 and no less than 20.

In one embodiment, the second time offset is a positive integer no greater than 100 and no less than an earliest time.

In one embodiment, the second priority is used to determine the earliest time.

In one embodiment, the earliest time is configured by a higher layer signaling.

In one embodiment, selection of the second time offset shall fulfill requirements of delay time.

In one embodiment, the first resource pool is a resource pool in SL.

In one embodiment, the resource pool in SL comprises the first resource pool.

In one embodiment, the Q3 first-type time-frequency resource sets comprised in the first resource pool belong to a resource pool in SL.

In one embodiment, the resource pool in SL is used for V2X.

In one embodiment, the resource pool in SL is used for SL transmissions.

In one embodiment, the resource pool in SL is used for PSSCH transmissions.

In one embodiment, the resource pool in SL is used for PSCCH transmissions.

In one embodiment, the resource pool in SL is used for PSFCH transmissions.

In one embodiment, the resource pool in SL is fixed.

In one embodiment, the resource pool in SL is configurable.

In one embodiment, the resource pool in SL is Semi-static configured.

In one embodiment, the resource pool in SL is configured by a higher layer signaling.

In one embodiment, the resource pool in SL is configured by an RRC signaling.

In one embodiment, the resource pool in SL is configured by an RRC IE.

In one embodiment, the resource pool in SL is configured by a MAC signaling.

In one embodiment, the candidate resource pool comprises Q2 first-type time-frequency resource set(s), and any of the Q2 first-type time-frequency resource set(s) comprises a positive integer number of time-frequency resource unit(s), where Q2 is a positive integer.

In one embodiment, the candidate resource pool belongs to the first resource pool.

In one embodiment, the first resource pool comprises the candidate resource pool.

In one embodiment, any of the Q2 first-type time-frequency resource set(s) comprised in the candidate resource pool belongs to the first resource pool.

In one embodiment, any of the Q2 first-type time-frequency resource set(s) comprised in the candidate resource pool is one of the Q3 first-type time-frequency resource set(s) comprised in the first resource pool, where Q2 is a positive integer no greater than Q3.

In one embodiment, the first resource pool comprises a first-type time-frequency resource set other than the candidate resource pool.

In one embodiment, there is a first-type time-frequency resource set in the first resource pool that is a first-type time-frequency resource set other than the candidate resource pool.

In one embodiment, the candidate resource pool and the first resource pool are the same.

In one embodiment, the Q3 first-type time-frequency resource set(s) comprised in the first resource pool are the same as the Q2 first-type time-frequency resource set(s) comprised in the candidate resource pool, where Q2 is equal to Q3.

In one embodiment, the first resource pool comprises a time-frequency resource unit other than the candidate resource pool.

In one embodiment, there is a time-frequency resource unit in the first resource pool that is a time-frequency resource unit other than the candidate resource pool.

In one embodiment, the target resource sub-pool comprises Q1 first-type time-frequency resource set(s), and any of the Q1 first-type time-frequency resource set(s) comprises a positive integer number of time-frequency resource unit(s), where Q1 is a positive integer.

In one embodiment, the target resource sub-pool belongs to the candidate resource pool.

In one embodiment, the candidate resource pool comprises the target resource sub-pool.

In one embodiment, any of the Q1 first-type time-frequency resource set(s) comprised in the target resource sub-pool belongs to the candidate resource pool.

In one embodiment, any of the Q1 first-type time-frequency resource set(s) comprised in the target resource sub-pool is one of the Q2 first-type time-frequency resource set(s) comprised in the candidate resource pool, where Q1 is a positive integer no greater than Q2.

In one embodiment, the candidate resource pool comprises a first-type time-frequency resource set other than the target resource sub-pool.

In one embodiment, there is a first-type time-frequency resource set in the candidate resource pool that is a first-type time-frequency resource set other than the target resource sub-pool.

In one embodiment, the target resource sub-pool is the same as the candidate resource pool.

In one embodiment, the Q2 first-type time-frequency resource set(s) comprised in the candidate resource pool are the same as the Q1 first-type time-frequency resource set(s) comprised in the target resource sub-pool, where Q1 is equal to Q2.

In one embodiment, the first time-frequency resource set belongs to the target resource sub-pool.

In one embodiment, the target resource sub-pool comprises the first time-frequency resource set.

In one embodiment, the target resource sub-pool does not comprise the first time-frequency resource set.

In one embodiment, the first time-frequency resource set is a first-type time-frequency resource set other than the Q1 first-type time-frequency resource set(s) comprised in the target resource sub-pool.

In one embodiment, the first time-frequency resource set is one of the Q3 first-type time-frequency resource set(s) comprised in the first resource pool, the first time-frequency resource set being different from any of the Q1 first-type time-frequency resource set(s) comprised in the target resource sub-pool.

In one embodiment, the first time-frequency resource set is one of the Q2 first-type time-frequency resource set(s) comprised in the candidate resource pool, the first time-frequency resource set being different from any of the Q1 first-type time-frequency resource set(s) comprised in the target resource sub-pool.

Embodiment 11

Figure 11:
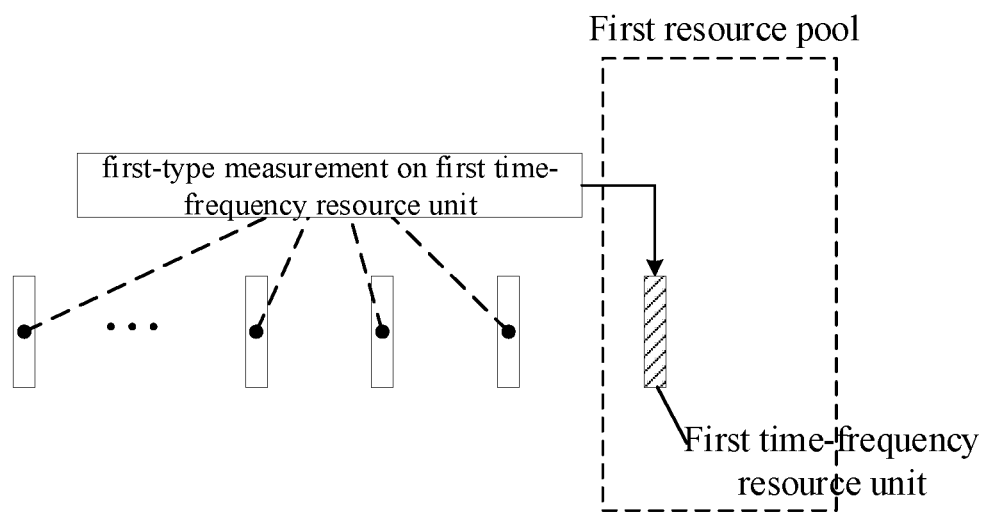
FIG. 11 illustrates a schematic diagram of a first-type measurement on a first time-frequency resource unit according to one embodiment of the present disclosure.

Embodiment 11 illustrates a schematic diagram a first-type measurement on a first time-frequency resource unit according to one embodiment of the present disclosure, as shown in FIG. 11. In FIG. 11, the large dotted-line box represents a first resource pool in the present disclosure; the rectangle filled with oblique lines represents a first time-frequency resource unit in the present disclosure; the rectangle without filling represents a time-frequency resource unit corresponding to the first time-frequency resource unit.

In Embodiment 11, when the first resource pool comprises a time-frequency resource unit other than the candidate resource pool, a measurement value obtained by a first-type measurement on the first time-frequency resource unit is higher than a first threshold, the first time-frequency resource unit is the time-frequency resource unit other than the candidate resource pool comprised in the first resource pool.

In one embodiment, a first time-frequency resource unit is a time-frequency resource unit other than the candidate resource pool comprised in the first resource pool.

In one embodiment, the first time-frequency resource unit is one of the Q3 first-type time-frequency resource set(s) comprised in the first resource pool, the first time-frequency resource unit being different from any of the Q2 first-type time-frequency resource set(s) comprised in the candidate resource pool.

In one embodiment, the first time-frequency resource unit comprises a positive integer number of consecutive sub-channels.

In one embodiment, the first time-frequency resource unit comprises a positive integer number of consecutive subcarriers.

In one embodiment, the first time-frequency resource unit comprises a Slot.

In one embodiment, the first time-frequency resource unit comprises a subframe.

In one embodiment, the first time-frequency resource unit comprises a positive integer number of multicarrier symbol(s).

In one embodiment, a first-type measurement on the first time-frequency resource unit is a PSSCH-Reference Signal Receiving Power (PSSCH-RSRP) measurement.

In one embodiment, a first-type measurement on the first time-frequency resource unit is a PSCCH-Reference Signal Receiving Power (PSCCH-RSRP) measurement.

In one embodiment, a first-type measurement on the first time-frequency resource unit is a Reference Signal Receiving Power (RSRP) measurement of DMRS of PSSCH.

In one embodiment, a first-type measurement on the first time-frequency resource unit is a filtered Reference Signal Receiving Power (filtered RSRP) measurement.

In one embodiment, a first-type measurement on the first time-frequency resource unit is a Layer-1 filtered Reference Signal Receiving Power (L1-filtered RSRP) measurement.

In one embodiment, a first-type measurement on the first time-frequency resource unit is a Layer-3 filtered Reference Signal Receiving Power (L3-filtered RSRP) measurement.

In one embodiment, a first-type measurement on the first time-frequency resource unit is a Pathloss (PL) measurement.

In one embodiment, a first-type measurement on the first time-frequency resource unit is a Transmitter-Receiver distance (TX-RX distance) measurement.

In one embodiment, a first-type measurement on the first time-frequency resource unit is a Received Signal Strength Indication (RSSI) measurement.

In one embodiment, a first-type measurement on the first time-frequency resource unit is a Sidelink-Received Signal Strength Indication (S-RSSI) measurement.

In one embodiment, a first-type measurement on the first time-frequency resource unit is a Reference Signal Receiving Quality (RSRQ) measurement.

In one embodiment, a first-type measurement on the first time-frequency resource unit is a Signal-to-Noise Ratio (SNR) measurement.

In one embodiment, a first-type measurement on the first time-frequency resource unit is a Signal to Interference plus Noise Ratio (SINR) measurement.

In one embodiment, a positive integer number of first-type time-frequency resource units are associated with the first time-frequency resource unit, and any of the positive integer number of first-type time-frequency resource units comprises a positive integer number of time-frequency resource unit(s).

In one embodiment, there is an equal number of time-domain resource units between any two first-type time-frequency resource units among the positive integer number of first-type time-frequency resource units.

In one embodiment, any of the positive integer number of first-type time-frequency resource units comprises a positive integer number of multicarrier symbol(s).

In one embodiment, any of the positive integer number of first-type time-frequency resource units comprises a slot.

In one embodiment, any of the positive integer number of first-type time-frequency resource units comprises a sub-frame.

In one embodiment, the positive integer number of first-type time-frequency resource units comprise same frequency-domain resources as the first time-frequency resource unit.

In one embodiment, the positive integer number of first-type time-frequency resource units are successively different from the first time-frequency resource unit by a positive integer number of time-domain resource unit(s) in time domain.

In one embodiment, the positive integer number of first-type time-frequency resource units and the first time-frequency resource unit are Time Division Multiplexing (TDM).

In one embodiment, any of the positive integer number of first-type time-frequency resource units is earlier than the first time-frequency resource unit.

In one embodiment, the positive integer number of first-type time-frequency resource units and the first time-frequency resource unit are periodic.

In one embodiment, a first-type measurement on the first time-frequency resource unit is to monitor the positive integer number of first-type time-frequency resource units.

In one embodiment, a first-type measurement on the first time-frequency resource unit is to receive a third signaling on any of the positive integer number of first-type time-frequency resource units and calculate an RSSI.

In one embodiment, the third signaling is transmitted in any of the positive integer number of first-type time-frequency resource units.

In one embodiment, a first-type measurement performed on the first time-frequency resource unit is to receive a positive integer number of third-type signalings respectively in the positive integer number of first-type time-frequency resource units, and calculate RSRP, where the third signaling is one of the positive integer number of third-type signalings.

In one embodiment, the positive integer number of third-type signalings are respectively transmitted in the positive integer number of first-type time-frequency resource units.

In one embodiment, a measurement value obtained by a first-type measurement on the first time-frequency resource unit is higher than the first threshold.

In one embodiment, a measurement value obtained by a first-type measurement on the first time-frequency resource unit is in dBm.

In one embodiment, a measurement value obtained by a first-type measurement on the first time-frequency resource unit is in dB.

In one embodiment, a measurement value obtained by a first-type measurement on the first time-frequency resource unit is in mW.

In one embodiment, a measurement value obtained by a first-type measurement on the first time-frequency resource unit is in W.

Embodiment 12

Figure 12:
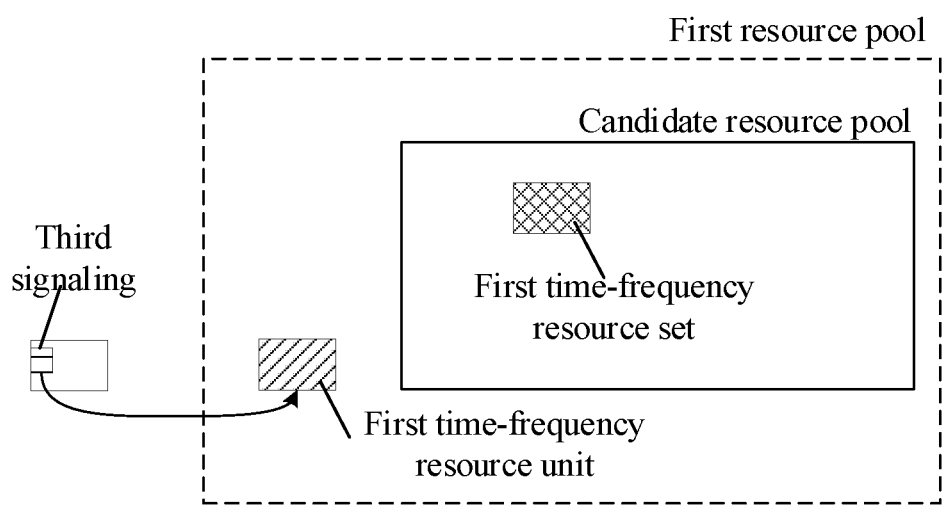
FIG. 12 illustrates a schematic diagram of relations between a first time-frequency resource unit a first time-frequency resource set, a candidate resource pool and a first resource pool according to one embodiment of the present disclosure.

Embodiment 12 illustrates a schematic diagram of relations between a first time-frequency resource unit a first time-frequency resource set, a candidate resource pool and a first resource pool according to one embodiment of the present disclosure, as shown in FIG. 12. In FIG. 12, the large dotted-line box represents a first resource pool in the present disclosure; the solid-line rectangle filled with oblique grids represents a first time-frequency resource set in the present disclosure; the solid-line rectangle filled with oblique lines represents a first time-frequency resource unit; the solid-line rectangle filled with horizontal lines represents a third signaling in the present disclosure.

In Embodiment 12, the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

In one embodiment, the third signaling comprises one or more fields in an SCI.

In one embodiment, a channel occupied by the third signaling comprises a PSCCH.

In one embodiment, the third signaling belongs to a SCI format.

In one embodiment, the third signaling is used to indicate the first time-frequency resource unit.

In one embodiment, the third signaling comprises frequency-domain resources occupied by the first time-frequency resource unit.

In one embodiment, the third signaling comprises time-domain resources occupied by the first time-frequency resource unit.

In one embodiment, the third signaling is used to determine the positive integer number of first-type time-frequency resource unit(s).

In one embodiment, the third signaling comprises frequency-domain resources occupied by any of the positive integer number of first-type time-frequency resource unit(s).

In one embodiment, the third signaling comprises time-domain resources occupied by any of the positive integer number of first-type time-frequency resource unit(s).

In one embodiment, the third signaling comprises a number of time-domain resource units between any two adjacent first-type time-frequency resource units among the positive integer number of first-type time-frequency resource units.

In one embodiment, the third signaling comprises a third priority, the third priority being a positive integer.

In one embodiment, the third priority is configured by a higher layer signaling.

In one embodiment, the third priority is a positive integer among P positive integers, where P is a positive integer.

In one embodiment, the third priority is a positive integer of 1 through P.

In one embodiment, the third priority is a non-negative integer among P non-negative integers, where P is a positive integer.

In one embodiment, the third priority is a non-negative integer of 0 through (P−1).

In one embodiment, the third priority is a priority of data transmitted in the positive integer number of first-type time-frequency resource unit(s).

In one embodiment, P is equal to 8.

In one embodiment, P is equal to 12.

In one embodiment, the third priority and the second priority are used to determine the first threshold.

In one embodiment, the third priority and the second priority are jointly used to determine an index of the first threshold in a first threshold list.

In one embodiment, an index of the first threshold in the first threshold list is equal to a sum of C multiples of the second priority and the third priority plus 1, where C is a positive integer.

In one embodiment, an index of the first threshold in the first threshold list is equal to a sum of C multiples of the third priority and the second priority plus 1, where C is a positive integer.

In one embodiment, C is equal to 8.

In one embodiment, C is equal to 10.

In one embodiment, the first threshold list comprises 67 thresholds.

In one embodiment, a threshold ranking first in the first threshold list is minus infinity dBm.

In one embodiment, a threshold ranking last in the first threshold list is infinity dBm.

In one embodiment, the first threshold list comprises [−128 dBm, −126 dBm . . . , 0 dBm].

In one embodiment, the first threshold list comprises [−infinity dBm, −128 dBm, −126 dBm . . . , 0 dBm, infinity dBm].

In one embodiment, any two adjacent thresholds in the first threshold list other than a threshold ranking first and a threshold ranking last are different by 2 dB.

In one embodiment, the first threshold is measured in dBm.

In one embodiment, the first threshold is measured in dB.

In one embodiment, the first threshold is measured in W.

In one embodiment, the first threshold is measured in mW.

In one embodiment, the first threshold is a threshold in [−infinity dBm, −128 dBm, −126 dBm . . . , 0 dBm, infinity dBm].

In one embodiment, the first threshold is equal to (−128+ (n−1)*2) dBm, where n is an index of the first threshold in the first threshold list, the n being a positive integer of 1 through 65.

Embodiment 13

Figure 13:
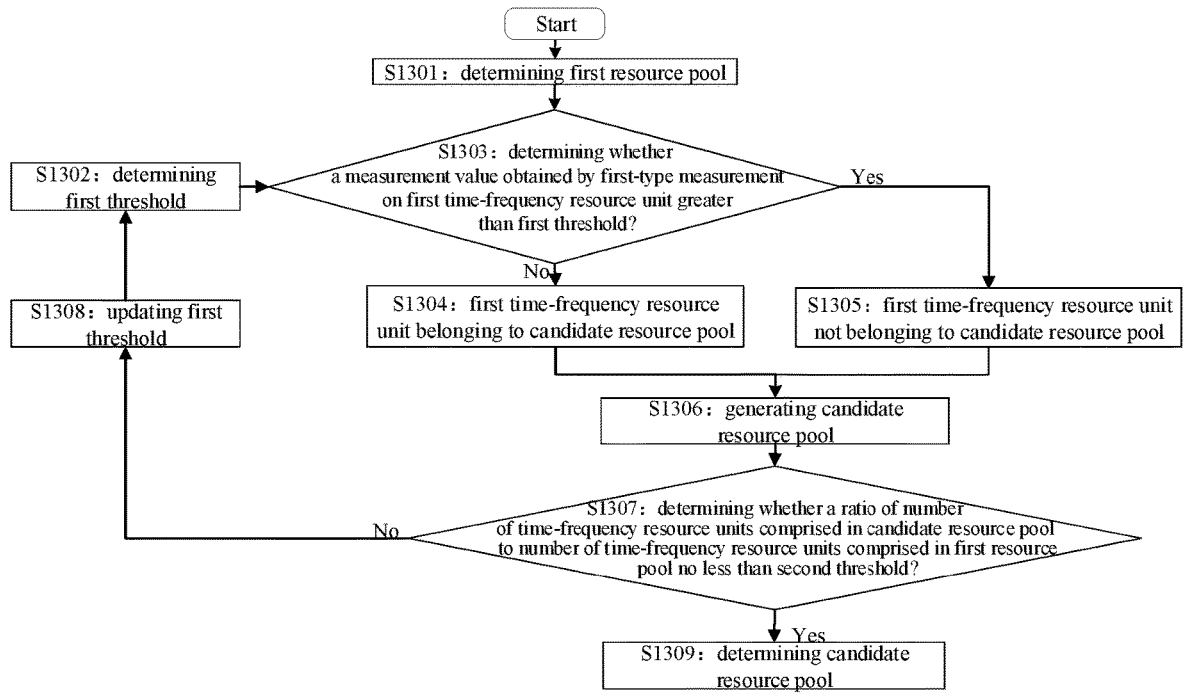
FIG. 13 illustrates a flowchart of determining a candidate resource pool according to one embodiment of the present disclosure.

Embodiment 13 illustrates a flowchart of determining a candidate resource pool according to one embodiment of the present disclosure, as shown in FIG. 13. In Embodiment 13, in step S1301, determine a first resource pool; in step S1302, determine a first threshold; in step S1303, determine whether a measurement value obtained by performing a first-type measurement on a first time-frequency resource unit is greater than a first threshold; when a result of "determining whether a measurement value obtained by performing a first-type measurement on a first time-frequency resource unit is greater than a first threshold" is "NO", perform step S1304, with a first time-frequency resource unit belonging to a candidate resource pool; when a result of "determining whether a measurement value obtained by performing a first-type measurement on a first time-frequency resource unit is greater than a first threshold" is "YES", perform step S1305, with a first time-frequency resource unit not belonging to a candidate resource pool; in step S1306, generate a candidate resource pool; in step S1307, determine whether a ratio between a number of time-frequency resource units comprised in a candidate resource pool and a number of time-frequency resource units comprised in a first resource pool is no smaller than a second threshold; when a result of "determining whether a ratio between a number of time-frequency resource units comprised in a candidate resource pool and a number of time-frequency resource units comprised in a first resource pool is no smaller than a second threshold" is "NO", perform step S1308, to update a first threshold; repeat the steps from S1302 to S1307, till a result of "determining whether a ratio between a number of time-frequency resource units comprised in a candidate resource pool and a number of time-frequency resource units comprised in a first resource pool is no smaller than a second threshold" turns to be "YES", and perform step S1309, to determine a candidate resource pool.

In Embodiment 13, a ratio of a number of time-frequency resource units comprised in the candidate resource pool to a number of time-frequency resource units comprised in the first resource pool is no less than a second threshold.

In one embodiment, a measurement value obtained by a first-type measurement on the first time-frequency resource unit is lower than the first threshold, the first time-frequency resource unit belonging to the candidate resource pool.

In one embodiment, a measurement value obtained by a first-type measurement on the first time-frequency resource unit is equal to the first threshold, the first time-frequency resource unit belonging to the candidate resource pool.

In one embodiment, the first time-frequency resource unit belonging to the candidate resource pool means that the first time-frequency resource unit is one of the Q2 first-type time-frequency resource set(s) comprised in the candidate resource pool.

In one embodiment, the first time-frequency resource unit belonging to the candidate resource pool means that the first time-frequency resource unit is a time-frequency resource unit in one of the Q2 first-type time-frequency resource set(s) comprised in the candidate resource pool.

In one embodiment, when a measurement value obtained by a first-type measurement on the first time-frequency resource unit is lower than the first threshold, a result of "determining whether a measurement value obtained by a first-type measurement on the first time-frequency resource unit is greater than a first threshold" is "NO".

In one embodiment, when a measurement value obtained by a first-type measurement on the first time-frequency resource unit is equal to the first threshold, a result of "determining whether a measurement value obtained by a first-type measurement on the first time-frequency resource unit is greater than a first threshold" is "NO".

In one embodiment, when a measurement value obtained by a first-type measurement on the first time-frequency resource unit is higher than the first threshold, a result of "determining whether a measurement value obtained by a first-type measurement on the first time-frequency resource unit is greater than a first threshold" is "YES".

In one embodiment, a number of time-frequency resource units comprised in the candidate resource pool is Q2.

In one embodiment, a number of time-frequency resource units comprised in the first resource pool is Q3.

In one embodiment, a ratio of a number of time-frequency resource units comprised in the candidate resource pool to a number of time-frequency resource units comprised in the first resource pool is a ratio of Q2 to Q3.

In one embodiment, when a ratio of Q2 to Q3 is greater than the second threshold, a result of "determining whether a ratio of a number of time-frequency resource units comprised in the candidate resource pool to a number of time-frequency resource units comprised in the first resource pool is no less than a second threshold" is "Yes".

In one embodiment, when a ratio of Q2 to Q3 is equal to the second threshold, a result of "determining whether a ratio of a number of time-frequency resource units comprised in the candidate resource pool to a number of time-frequency resource units comprised in the first resource pool is no less than a second threshold" is "Yes".

In one embodiment, when a ratio of Q2 to Q3 is less than the second threshold, a result of "determining whether a ratio of a number of time-frequency resource units comprised in the candidate resource pool to a number of time-frequency resource units comprised in the first resource pool is no less than a second threshold" is "No".

In one embodiment, when a result of "determining whether a ratio of a number of time-frequency resource units comprised in the candidate resource pool to a number of time-frequency resource units comprised in the first resource pool is no less than a second threshold" is "Yes", the candidate resource pool in step S1309 is the candidate resource pool generated in step S1306.

In one embodiment, when a result of "determining whether a ratio of a number of time-frequency resource units comprised in the candidate resource pool to a number of time-frequency resource units comprised in the first resource pool is no less than a second threshold" is "No", the candidate resource pool in step S1309 is not the candidate resource pool generated in step S1306.

In one embodiment, when a ratio of Q2 to Q3 is greater than the second threshold, the candidate resource pool in step S1309 is the candidate resource pool generated in step S1306.

In one embodiment, when a ratio of Q2 to Q3 is equal to the second threshold, the candidate resource pool in step S1309 is the candidate resource pool generated in step S1306.

In one embodiment, when a ratio of Q2 to Q3 is less than the second threshold, the candidate resource pool in step S1309 is the candidate resource pool generated in step S1306.

In one embodiment, the second threshold is default.

In one embodiment, the second threshold is configurable.

In one embodiment, the second threshold is pre-configured.

In one embodiment, the second threshold is equal to 0.2.

In one embodiment, the second threshold is equal to a value other than 0.2.

In one embodiment, the second threshold is greater than 0.

In one embodiment, the second threshold is no greater than 1.

In one embodiment, the phrase of "updating a first threshold" refers to the first threshold plus a power value.

In one embodiment, the power value is 3 dB.

In one embodiment, the power value is 1 dB.

In one embodiment, the phrase of "updating a first threshold" refers to the first threshold plus 3 dB.

In one embodiment, the phrase of "updating a first threshold" refers to the first threshold upon updating plus 3 dB.

Embodiment 14

Figure 14:
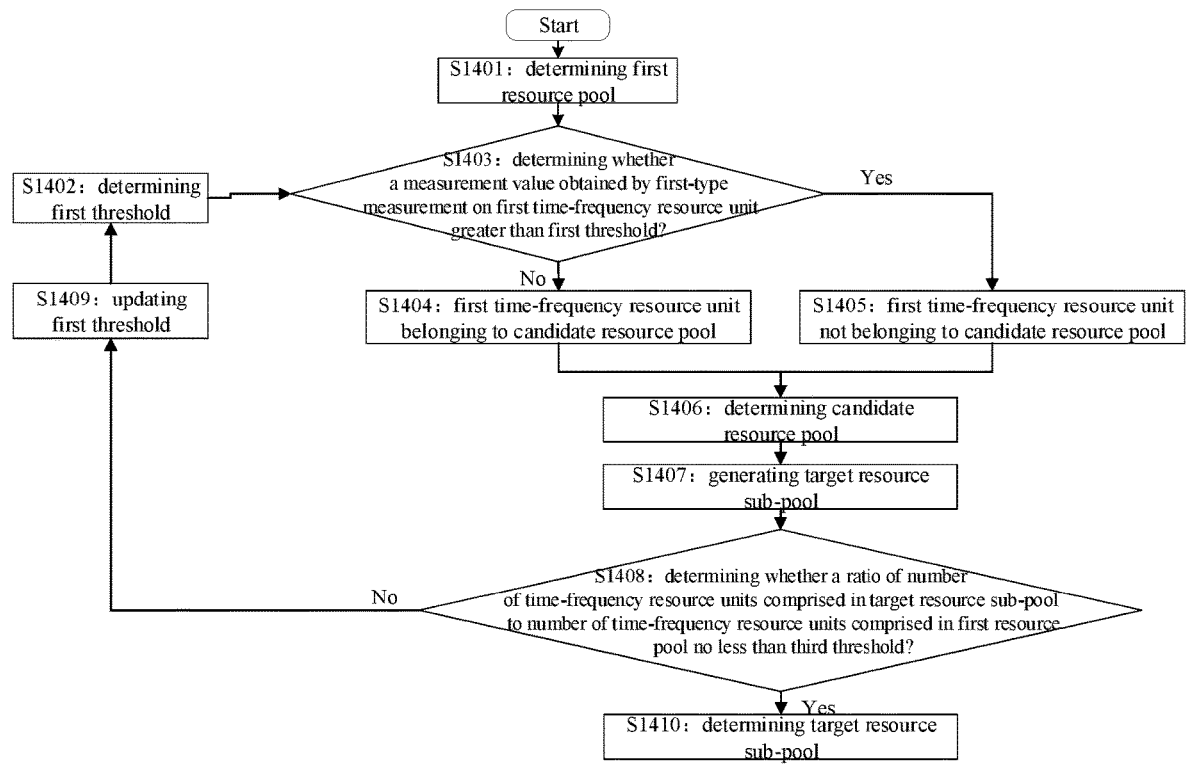
FIG. 14 illustrates a flowchart of determining a target resource sub-pool according to one embodiment of the present disclosure.

Embodiment 14 illustrates a flowchart of determining a target resource sub-pool according to one embodiment of the present disclosure, as shown in FIG. 14. In Embodiment 14, in step S1401, determine a first resource pool; in step S1402, determine a first threshold; in step S1403, determine whether a measurement value obtained by performing a first-type measurement on a first time-frequency resource unit is greater than a first threshold; when a result of "determining whether a measurement value obtained by performing a first-type measurement on a first time-frequency resource unit is greater than a first threshold" is "NO", perform step S1404, with a first time-frequency resource unit belonging to a candidate resource pool; when a result of "determining whether a measurement value obtained by performing a first-type measurement on a first time-frequency resource unit is greater than a first threshold" is "YES", perform step S1405, with a first time-frequency resource unit not belonging to a candidate resource pool; in step S1406, determine a candidate resource pool; in step S1407, generate a target resource sub-pool; in step S1408, determine whether a ratio between a number of time-frequency resource units comprised in a target resource sub-pool and a number of time-frequency resource units comprised in a first resource pool is no smaller than a third threshold; when a result of "determining whether a ratio between a number of time-frequency resource units comprised in a target resource sub-pool and a number of time-frequency resource units comprised in a first resource pool is no smaller than a third threshold" is "NO", perform step S1409, to update a first threshold; repeat the steps from S1402 to S1408, till a result of "determining whether a ratio between a number of time-frequency resource units comprised in a target resource sub-pool and a number of time-frequency resource units comprised in a first resource pool is no smaller than a third threshold" turns to be "YES", and perform step S1410, to determine a target resource sub-pool.

In one embodiment, a number of time-frequency resource units comprised in the target resource sub-pool is Q1.

In one embodiment, a number of time-frequency resource units comprised in the first resource pool is Q3.

In one embodiment, a ratio of a number of time-frequency resource units comprised in the target resource sub-pool to a number of time-frequency resource units comprised in the first resource pool is a ratio of Q1 to Q3.

In one embodiment, when a ratio of Q1 to Q3 is greater than the third threshold, a result of "determining whether a ratio of a number of time-frequency resource units comprised in the target resource sub-pool to a number of time-frequency resource units comprised in the first resource pool is no less than a second threshold" is "Yes".

In one embodiment, when a ratio of Q1 to Q3 is equal to the third threshold, a result of "determining whether a ratio of a number of time-frequency resource units comprised in the target resource sub-pool to a number of time-frequency resource units comprised in the first resource pool is no less than a second threshold" is "Yes".

In one embodiment, when a ratio of Q1 to Q3 is less than the third threshold, a result of "determining whether a ratio of a number of time-frequency resource units comprised in the target resource sub-pool to a number of time-frequency resource units comprised in the first resource pool is no less than a second threshold" is "No".

In one embodiment, when a result of "determining whether a ratio of a number of time-frequency resource units comprised in the target resource sub-pool to a number of time-frequency resource units comprised in the first resource pool is no less than a second threshold" is "Yes", the target resource sub-pool in step S1410 is the target resource sub-pool generated in step S1407.

In one embodiment, when a result of "determining whether a ratio of a number of time-frequency resource units comprised in the target resource sub-pool to a number of time-frequency resource units comprised in the first resource pool is no less than a second threshold" is "No", the target resource sub-pool in step S1410 is not the target resource sub-pool generated in step S1407.

In one embodiment, when a ratio of Q1 to Q3 is greater than the third threshold, the target resource sub-pool in step S1410 is the target resource sub-pool generated in step S1407.

In one embodiment, when a ratio of Q1 to Q3 is equal to the third threshold, the target resource sub-pool in step S1410 is the target resource sub-pool generated in step S1407.

In one embodiment, when a ratio of Q1 to Q3 is less than the third threshold, the target resource sub-pool in step S1410 is the target resource sub-pool generated in step S1407.

In one embodiment, the third threshold is default.

In one embodiment, the third threshold is configurable.

In one embodiment, the third threshold is pre-configured.

In one embodiment, the third threshold is equal to 0.2.

In one embodiment, the third threshold is equal to a value other than 0.2.

In one embodiment, the third threshold is greater than 0.

In one embodiment, the third threshold is no greater than 1.

Embodiment 15

Figure 15:
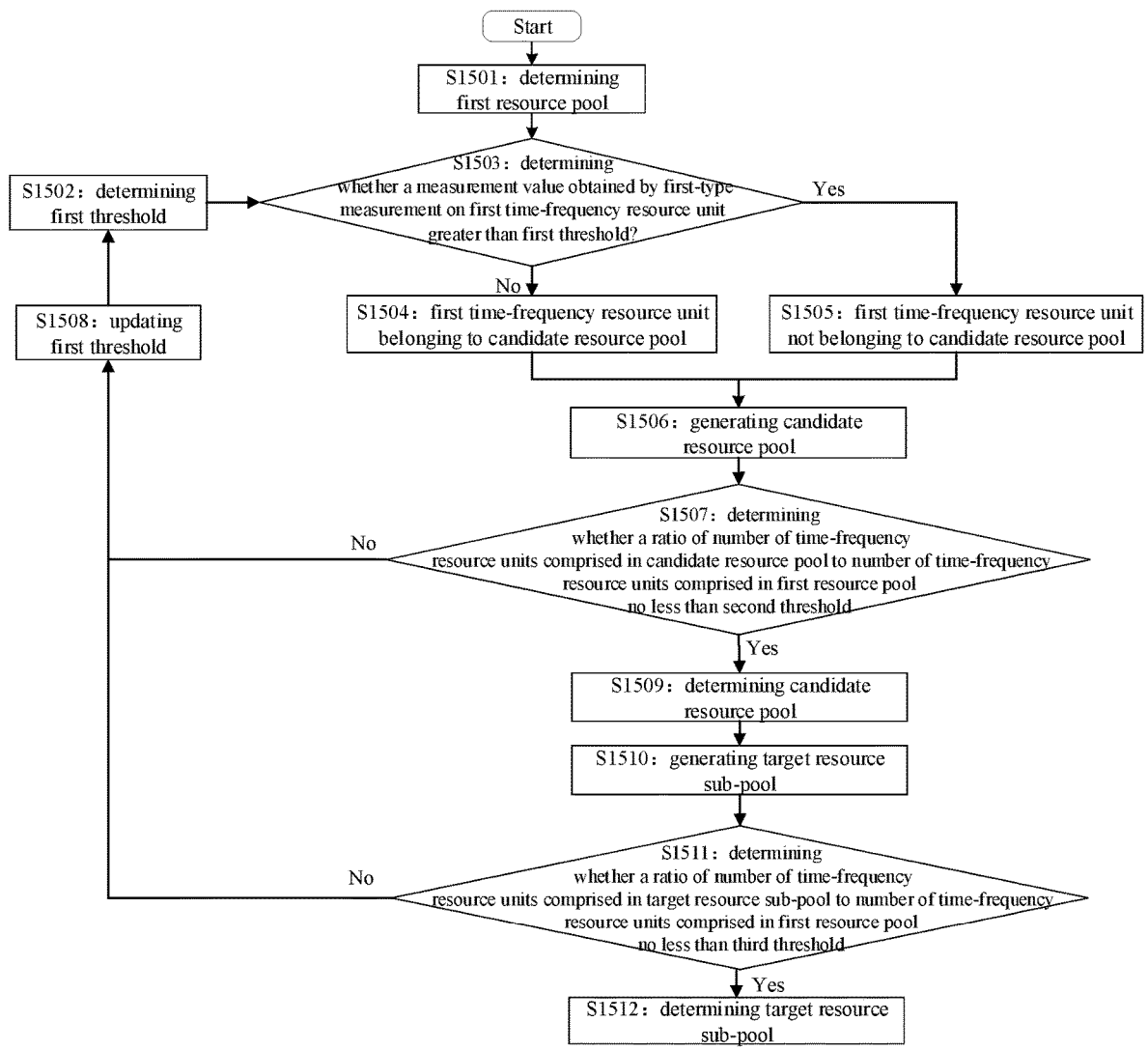
FIG. 15 illustrates a flowchart of determining a target resource sub-pool according to one embodiment of the present disclosure.

Embodiment 15 illustrates a flowchart of determining a target resource sub-pool according to one embodiment of the present disclosure, as shown in FIG. 15. In Embodiment 15, in step S1501, determine a first resource pool; in step S1502, determine a first threshold; in step S1503, determine whether a measurement value obtained by performing a first-type measurement on a first time-frequency resource unit is greater than a first threshold; when a result of "determining whether a measurement value obtained by performing a first-type measurement on a first time-frequency resource unit is greater than a first threshold" is "NO", perform step S1504, with a first time-frequency resource unit belonging to a candidate resource pool; when a result of "determining whether a measurement value obtained by performing a first-type measurement on a first time-frequency resource unit is greater than a first threshold" is "YES", perform step S1505, with a first time-frequency resource unit not belonging to a candidate resource pool; in step S1506, generate a candidate resource pool; and in step S1507, determine whether a ratio between a number of time-frequency resource units comprised in a candidate resource pool and a number of time-frequency resource units comprised in a first resource pool is no smaller than a second threshold; when a result of "determining whether a ratio between a number of time-frequency resource units comprised in a candidate resource pool and a number of time-frequency resource units comprised in a first resource pool is no smaller than a second threshold" is "NO", perform step S1508, to update a first threshold; repeat the steps from S1502 to S1507, till a result of "determining whether a ratio between a number of time-frequency resource units comprised in a candidate resource pool and a number of time-frequency resource units comprised in a first resource pool is no smaller than a second threshold" turns to be "YES", and perform step S1509, to determine a candidate resource pool; in step S1510, generate a target resource sub-pool; in step S1511, determine whether a ratio between a number of time-frequency resource units comprised in a target resource sub-pool and a number of time-frequency resource units comprised in a first resource pool is no smaller than a third threshold; when a result of "determining whether a ratio between a number of time-frequency resource units comprised in a target resource sub-pool and a number of time-frequency resource units comprised in a first resource pool is no smaller than a third threshold" is "NO", perform step S1508, to update a first threshold; repeat the steps from S1502 to S1511, till a result of "determining whether a ratio between a number of time-frequency resource units comprised in a target resource sub-pool and a number of time-frequency resource units comprised in a first resource pool is no smaller than a third threshold" turns to be "YES", and perform step S1512, to determine a target resource sub-pool.

In one embodiment, the phrase that "the third threshold is pre-defined" comprises the meaning that the third threshold is related to the second threshold, where the second threshold in the present disclosure is pre-defined.

In one embodiment, the phrase that "the third threshold is pre-defined" comprises the meaning that the third threshold is a product of the second threshold and a first coefficient.

In one embodiment, the first coefficient is greater than 0.

In one embodiment, the first coefficient is no greater than 1.

In one embodiment, the first coefficient is a positive integer.

In one embodiment, the phrase that "the third threshold is pre-defined" comprises the meaning that the third threshold is a sum of the second threshold and a second coefficient.

In one embodiment, the second coefficient is greater than 0.

In one embodiment, the second coefficient is no greater than 1.

Embodiment 16

Figure 16:
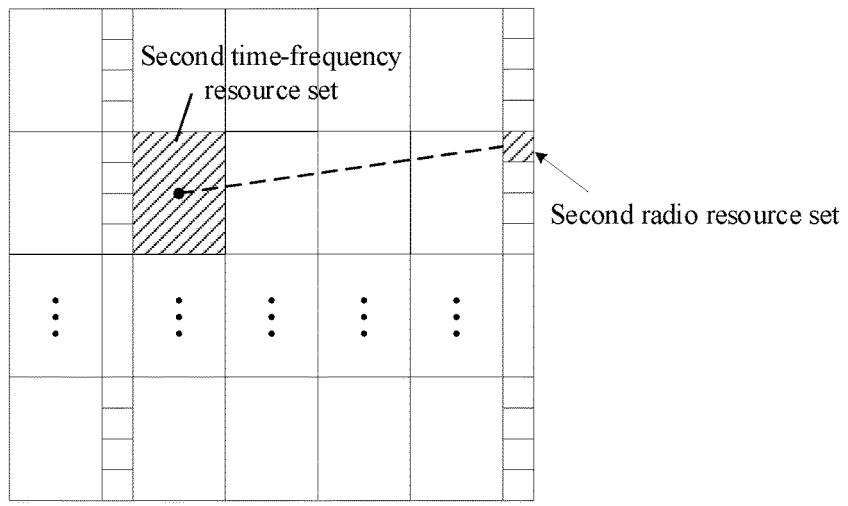
FIG. 16 illustrates a schematic diagram of a relationship between a second time-frequency resource unit and a second radio resource set according to one embodiment of the present disclosure.

Embodiment 16 illustrates a schematic diagram of a relationship between a second time-frequency resource unit and a second radio resource set according to one embodiment of the present disclosure, as shown in FIG. 16. In FIG. 16, the rectangle filled with oblique lines represents the second time-frequency resource unit in the present disclosure; the solid-line framed square filled with oblique lines represents the second radio resource set in the present disclosure.

In Embodiment 16, the second signal is used to determine whether the first signal is correctly received; when the second signal is transmitted, the second signal occupies a second radio resource set; the second time-frequency resource set is used to determine the second radio resource set.

In one embodiment, the second signal comprises a SFI.

In one embodiment, the second signal comprises a UCI.

In one embodiment, a channel occupied by the second signal comprises a PSFCH.

In one embodiment, a channel occupied by the second signal comprises a PSCCH transmission.

In one embodiment, a channel occupied by the second signal comprises a PSSCH transmission.

In one embodiment, a channel occupied by the second signal comprises a PUCCH transmission.

In one embodiment, the second signal is broadcast.

In one embodiment, the second signal is groupcast.

In one embodiment, the second signal is unicast.

In one embodiment, the second signal is Cell-Specific.

In one embodiment, the second signal is UE-Specific.

In one embodiment, the second signal comprises an RS

In one embodiment, the second signal comprises a DMRS

In one embodiment, the second signal comprises a CSI-RS

In one embodiment, the second signal is used for indicating whether the first signal is correctly received.

In one embodiment, the second signal indicates that the first signal is correctly received.

In one embodiment, the second signal indicates that the first signal is not correctly received.

In one embodiment, the second signal indicates that the first signal is correctly received; or, the second signal indicates that the first signal is not correctly received.

In one embodiment, the second signal only indicates that the first signal is not correctly received.

In one embodiment, the first signal being correctly received comprises: a result of performing channel decoding on the first signal is passed by CRC.

In one embodiment, the first signal being correctly received comprises: a result of performing received power detection on the first signal is higher than a given received power threshold.

In one embodiment, the first signal being correctly received comprises: an average value of performing multiple received power detections on the first signal is higher than a given received power threshold.

In one embodiment, the first signal being correctly received comprises: a result of performing channel decoding on the first signal is failed by CRC.

In one embodiment, the first signal being correctly received comprises: a result of performing received power detection on the first signal is no higher than a given received power threshold.

In one embodiment, the first signal being correctly received comprises: an average value of performing multiple received power detections on the first signal is no higher than a given received power threshold.

In one embodiment, the phrase of being correctly received comprises: performing channel decoding on a radio signal, of which a result is passed by CRC.

In one embodiment, the phrase of being correctly received comprises: performing energy detection on the radio signal within a period of time, yielding a result of which an average value within the period exceeds a first given threshold In one embodiment, the phrase of being correctly received comprises: performing coherent detection on the radio signal, through which a signal energy obtained exceeds a second given threshold.

In one embodiment, the channel decoding is based on Viterbi Algorithm.

In one embodiment, the channel decoding is based on iteration.

In one embodiment, the channel decoding is based on Belief Propagation (BP) Algorithm.

In one embodiment, the channel decoding is based on Log Likelihood Ratio (LLR)-BP Algorithm.

In one embodiment, only when the first signal is correctly received will the second signal be transmitted.

In one embodiment, only when the first signal is not correctly received will the second signal be transmitted.

In one embodiment, when the first signal is correctly received, drop transmitting the second signal; when the first signal is not correctly received, transmit the second signal.

In one embodiment, the second signal comprises a Hybrid Automatic Repeat reQuest (HARQ).

In one embodiment, the second signal comprises either a Hybrid Automatic Repeat request-Acknowledge (HARQ-ACK) or a Hybrid Automatic Repeat request-Negative Acknowledge (HARQ-NACK).

In one embodiment, the second signal comprises a HARQ-ACK.

In one embodiment, the second signal comprises a HARQ-NACK.

In one embodiment, the second signal comprises a Sidelink HARQ (SL HARQ).

In one embodiment, the second signal comprises a first sequence.

In one embodiment, the first sequence is used for generating the second signal.

In one embodiment, the first sequence is generated by a pseudo-random sequence.

In one embodiment, the first sequence is generated by a Gold sequence.

In one embodiment, the first sequence is generated by an M sequence.

In one embodiment, the first sequence is generated by a Zadeoff-Chu sequence.

In one embodiment, the first sequence is a PUCCH Format 0 Baseband Sequence.

In one embodiment, the first sequence is the same as a PUCCH Format 0 Baseband Sequence.

In one embodiment, the first sequence is a cyclic shift of a PUCCH Format 0 Baseband Sequence.

In one embodiment, the first sequence is a PUCCH Format 1 Baseband Sequence.

In one embodiment, the first sequence is the same as a PUCCH Format 1 Baseband Sequence.

In one embodiment, the first sequence is a cyclic shift of a PUCCH Format 1 Baseband Sequence.

In one embodiment, for generation of the first sequence, refer to 3GPP TS38.211, Section 6.3.2.

In one embodiment, the first sequence is used for indicating a HARQ-ACK.

In one embodiment, the first sequence is used for indicating a HARQ-NACK.

In one embodiment, the first sequence is used for indicating that the first signal is correctly received.

In one embodiment, the first sequence is used for indicating that the first signal is not correctly received.

In one embodiment, the second signal is generated by the first sequence through a cyclic shift, Sequence Generation and Physical Resource Mapping.

In one embodiment, the second signal is generated by the first sequence through a cyclic shift, Sequence Generation, Sequence Modulation, Time-domain Spreading and Physical Resource Mapping.

In one embodiment, the second signal comprises a HARQ Codebook.

In one embodiment, the second signal comprises a semi-persistent HARQ Codebook.

In one embodiment, the second signal comprises a dynamic HARQ Codebook.

In one embodiment, the second signal comprises a positive integer number of information bit(s), where the positive integer number of information bit(s) in the second signal is(are respectively) used for indicating whether the positive integer number of first-type bit block(s) comprised in the first bit block set in the first signal is(are) correctly received.

In one embodiment, the second signal comprises a positive integer number of information bit(s), where the positive integer number of information bit(s) in the second signal is(are respectively) used for indicating that the positive integer number of first-type bit block(s) comprised in the first bit block set in the first signal is(are) correctly received.

In one embodiment, the second signal comprises a positive integer number of information bit(s), where the positive integer number of information bit(s) in the second signal is(are respectively) used for indicating that the positive integer number of first-type bit block(s) comprised in the first bit block set is(are) not correctly received.

In one embodiment, the positive integer number of information bit(s) comprised in the second signal is(are respectively) corresponding to the positive integer number of first-type bit block(s) comprised in the first bit block set in the first signal.

In one embodiment, the positive integer number of information bit(s) comprised in the second signal makes(make) up a HARQ Codebook.

In one embodiment, the positive integer number of information bits comprised in the second signal comprise multiple HARQ Codebooks.

In one embodiment, a first information bit is any information bit of the positive integer number of information bit(s) comprised in the second signal, and a first target bit block is one of the positive integer number of first-type bit block(s) comprised in the first bit block set that corresponds to the first information bit, the first information bit being used to indicate whether the first target bit block is correctly received.

In one embodiment, the first information bit being used for indicating whether the first target bit block is correctly received comprises the fact that the first information bit indicates that the first target bit block is correctly received.

In one embodiment, the first information bit being used for indicating whether the first target bit block is correctly received comprises the fact that the first information bit indicates that the first target bit block is not correctly received.

In one embodiment, the first information bit being used for indicating whether the first target bit block is correctly received comprises the fact that the first information bit indicates that the first target bit block is not correctly received, or that the first information bit indicates that the first target bit block is correctly received.

In one embodiment, the second signal comprises a second information bit, the second information bit being used for indicating that the positive integer number of first-type bit block(s) comprised in the first bit block set is(are) correctly received.

In one embodiment, the second signal comprises a second information bit, the second information bit being used for indicating that the positive integer number of first-type bit block(s) comprised in the first bit block set is(are) not correctly received.

In one embodiment, the positive integer number of information bit(s) comprised in the second signal indicates(respectively indicate) HARQ information.

In one embodiment, the positive integer number of information bit(s) comprised in the second signal is(are respectively) binary bit(s).

In one embodiment, the first information bit indicates HARQ information.

In one embodiment, the first information bit indicates HARQ-NACK information.

In one embodiment, the second information bit indicates HARQ information.

In one embodiment, the second information bit indicates HARQ-NACK information.

In one embodiment, the first information bit is of a value of "0".

In one embodiment, the first information bit is of a value of "1".

In one embodiment, the first information bit is of a Boolean value of "TRUE".

In one embodiment, the first information bit is of a Boolean value of "FALSE".

In one embodiment, the second information bit is of a value of "0".

In one embodiment, the second information bit is of a value of "1".

In one embodiment, the second information bit is of a Boolean value of "TRUE".

In one embodiment, the second information bit is of a Boolean value of "FALSE".

In one embodiment, the second signal is generated by the positive integer number of information bit(s) sequentially through Channel Coding, Scrambling and Modulation, and Physical Resource Mapping.

In one embodiment, the second signal is generated by the positive integer number of information bit(s) sequentially through Channel Coding, Scrambling and Modulation, and Physical Resource Mapping.

In one embodiment, the second signal is generated by the positive integer number of information bit(s) sequentially through Channel Coding, Scrambling and Modulation, DFT Precoding, and Physical Resource Mapping.

In one embodiment, the second signal is generated by the positive integer number of information bit(s) sequentially through Channel Coding, Scrambling and Modulation, Block-wise Spreading, DFT Precoding, and Physical Resource Mapping.

In one embodiment, the positive integer number of information bit(s) comprised in the second signal is(are) transmitted in a PUCCH format 2.

In one embodiment, the positive integer number of information bit(s) comprised in the second signal is(are) transmitted in a PUCCH format 3.

In one embodiment, the positive integer number of information bit(s) comprised in the second signal is(are) transmitted in a PUCCH format 4.

In one embodiment, the second radio resource set comprises a positive integer number of time-frequency resource unit(s).

In one embodiment, the second radio resource set comprises a positive integer number of time-domain resource unit(s).

In one embodiment, the second radio resource set comprises a positive integer number of frequency-domain resource unit(s).

In one embodiment, the second radio resource set comprises a positive integer number of Pseudo-Random Sequence(s).

In one embodiment, the second radio resource set comprises a positive integer number of Low-PAPR Sequence(s).

In one embodiment, the second radio resource set comprises a positive integer number of Base Sequence(s).

In one embodiment, the second radio resource set comprises a sequence generated by a Base Sequence through a positive integer number of cyclic shift(s).

In one embodiment, time-domain resources comprised in the second radio resource set are a positive integer number of time-domain resource unit(s).

In one embodiment, frequency-domain resources comprised in the second radio resource set are a positive integer number of frequency-domain resource unit(s).

In one embodiment, time-frequency resources comprised in the second radio resource set are a positive integer number of time-frequency resource unit(s).

In one embodiment, code-domain resources comprised in the second radio resource set are a positive integer number of Pseudo-Random Sequence(s).

In one embodiment, code-domain resources comprised in the second radio resource set are a positive integer number of Pseudo-Random Sequence(s).

In one embodiment, code-domain resources comprised in the second radio resource set are a positive integer number of low-PAPR Sequence(s).

In one embodiment, code-domain resources comprised in the second radio resource set are a positive integer number of Base Sequence(s).

In one embodiment, code-domain resources comprised in the second radio resource set is a sequence generated after a Base Sequence through a positive integer number of cyclic shift(s).

In one embodiment, the positive integer number of Pseudo-Random Sequences comprised in the second radio resource set are orthogonal.

In one embodiment, initial values of the positive integer number of Pseudo-Random Sequences comprised in the second radio resource set are the same.

In one embodiment, initial values of the positive integer number of Pseudo-Random Sequences comprised in the second radio resource set are mutually different.

In one embodiment, initial values of the positive integer number of Pseudo-Random Sequences comprised in the second radio resource set are the same, but cyclic shifts of the positive integer number of Pseudo-Random Sequences are mutually different.

In one embodiment, a positive integer number of frequency-domain resource units comprised in the second radio resource set are consecutive in frequency domain.

In one embodiment, the second radio resource set comprises a positive integer number of sub-channel(s).

In one embodiment, the second radio resource set comprises a positive integer number of PRB(s).

In one embodiment, the second radio resource set comprises a positive integer number of consecutive PRBs.

In one embodiment, the second radio resource set comprises a positive integer number of subcarrier(s).

In one embodiment, the second radio resource set comprises a positive integer number of consecutive subcarriers.

In one embodiment, the second radio resource set comprises a positive integer number of subframe(s).

In one embodiment, the second radio resource set comprises a positive integer number of slot(s).

In one embodiment, the second radio resource set comprises a positive integer number of multicarrier symbol(s).

In one embodiment, the second radio resource set comprises a positive integer number of sub-channel(s) and a positive integer number of slot(s).

In one embodiment, the second radio resource set comprises a positive integer number of sub-channel(s) and a positive integer number of multicarrier symbol(s).

In one embodiment, the second radio resource set comprises a positive integer number of PRB(s) and a positive integer number of slot(s).

In one embodiment, the second radio resource set comprises a positive integer number of PRBs) and a positive integer number of multicarrier symbol(s).

In one embodiment, the second radio resource set comprises a positive integer number of subcarriers) and a positive integer number of multicarrier symbol(s).

In one embodiment, the second radio resource set comprises a positive integer number of RE(s).

In one embodiment, the second radio resource set comprises a positive integer number of slot(s) in time domain and a positive integer number of sub-channel(s) in frequency domain.

In one embodiment, the second radio resource set comprises a positive integer number of multicarrier symbol(s) in time domain and a positive integer number of subcarrier(s) in frequency domain.

In one embodiment, the second radio resource set is used for SL transmission.

In one embodiment, the second radio resource set comprises a PSFCH.

In one embodiment, the second radio resource set is a PSFCH.

In one embodiment, the second radio resource set comprises a PUCCH.

In one embodiment, the second radio resource set comprises a PRACH.

In one embodiment, the second time-frequency resource set is used to determine the second radio resource set.

In one embodiment, time-domain resources comprised in the second time-frequency resource set are used to determine the second radio resource set.

In one embodiment, time-domain resources comprised in the second time-frequency resource set are used to determine time-domain resources comprised in the second radio resource set.

In one embodiment, time-domain resources comprised in the second time-frequency resource set are used to determine frequency-domain resources comprised in the second radio resource set.

In one embodiment, time-domain resources comprised in the second time-frequency resource set are used to determine time-frequency resources comprised in the second radio resource set.

In one embodiment, time-domain resources comprised in the second time-frequency resource set are used to determine code-domain resources comprised in the second radio resource set.

In one embodiment, time-domain resources comprised in the second time-frequency resource set are used to determine frequency-domain resources comprised in the second radio resource set and code-domain resources comprised in the second radio resource set.

In one embodiment, time-domain resources comprised in the second time-frequency resource set are used to determine PRBs comprised in the second radio resource set.

In one embodiment, time-domain resources comprised in the second time-frequency resource set are used to determine multicarrier symbols comprised in the second radio resource set.

In one embodiment, frequency-domain resources comprised in the second time-frequency resource set are used to determine the second radio resource set.

In one embodiment, frequency-domain resources comprised in the second time-frequency resource set are used to determine time-domain resources comprised in the second radio resource set.

In one embodiment, frequency-domain resources comprised in the second time-frequency resource set are used to determine frequency-domain resources comprised in the second radio resource set.

In one embodiment, frequency-domain resources comprised in the second time-frequency resource set are used to determine time-frequency resources comprised in the second radio resource set.

In one embodiment, frequency-domain resources comprised in the second time-frequency resource set are used to determine code-domain resources comprised in the second radio resource set.

In one embodiment, frequency-domain resources comprised in the second time-frequency resource set are used to determine frequency-domain resources comprised in the second radio resource set and code-domain resources comprised in the second radio resource set.

In one embodiment, frequency-domain resources comprised in the second time-frequency resource set are used to determine PRBs comprised in the second radio resource set.

In one embodiment, frequency-domain resources comprised in the second time-frequency resource set are used to determine multicarrier symbols comprised in the second radio resource set.

In one embodiment, time-frequency resources comprised in the second time-frequency resource set are used to determine the second radio resource set.

In one embodiment, time-frequency resources comprised in the second time-frequency resource set are used to determine time-domain resources comprised in the second radio resource set.

In one embodiment, time-frequency resources comprised in the second time-frequency resource set are used to determine frequency-domain resources comprised in the second radio resource set.

In one embodiment, time-frequency resources comprised in the second time-frequency resource set are used to determine time-frequency resources comprised in the second radio resource set.

In one embodiment, time-frequency resources comprised in the second time-frequency resource set are used to determine code-domain resources comprised in the second radio resource set.

In one embodiment, time-frequency resources comprised in the second time-frequency resource set are used to determine frequency-domain resources comprised in the second radio resource set and code-domain resources comprised in the first radio resource set.

In one embodiment, time-frequency resources comprised in the second time-frequency resource set are used to determine PRBs comprised in the second radio resource set.

In one embodiment, time-frequency resources comprised in the second time-frequency resource set are used to determine multicarrier symbols comprised in the second radio resource set.

In one embodiment, the second time-frequency resource set and the second identifier are jointly used to determine the second radio resource set.

In one embodiment, time-domain resources comprised in the second time-frequency resource set and the second identifier are jointly used to determine time-domain resources comprised in the second radio resource set.

In one embodiment, time-domain resources comprised in the second time-frequency resource set and the second identifier are jointly used to determine frequency-domain resources comprised in the second radio resource set.

In one embodiment, time-domain resources comprised in the second time-frequency resource set and the second identifier are jointly used to determine time-frequency resources comprised in the second radio resource set.

In one embodiment, time-domain resources comprised in the second time-frequency resource set and the second identifier are jointly used to determine code-domain resources comprised in the second radio resource set.

In one embodiment, time-domain resources comprised in the second time-frequency resource set and the second identifier are jointly used to determine PRBs comprised in the second radio resource set.

In one embodiment, time-domain resources comprised in the second time-frequency resource set and the first identifier are jointly used to determine multicarrier symbols comprised in the second radio resource set.

In one embodiment, frequency-domain resources comprised in the second time-frequency resource set are used to determine frequency-domain resources comprised in the second radio resource set, and the second identifier is used to determine code-domain resources comprised in the second radio resource set.

In one embodiment, frequency-domain resources comprised in the second time-frequency resource set are used to determine PRBs comprised in the second radio resource set, and the second identifier is used to determine pseudo-random sequences comprised in the second radio resource set.

In one embodiment, frequency-domain resources comprised in the second time-frequency resource set are used to determine PRBs comprised in the second radio resource set, and the second identifier is used to determine low-PAPR sequences comprised in the second radio resource set.

Embodiment 17

Figure 17:
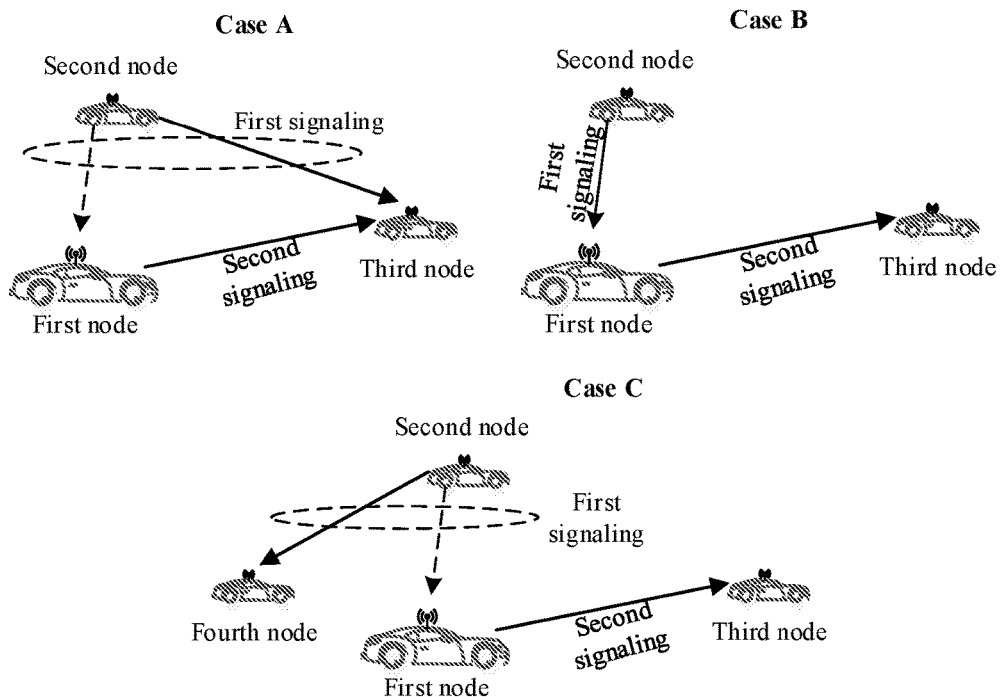
FIG. 17 illustrates a schematic diagram of a relationship between a first transmission node and a second transmission node according to one embodiment of the present disclosure.

Embodiment 17 illustrates a schematic diagram of a relationship between a first transmission node and a second transmission node according to one embodiment of the present disclosure, as shown in FIG. 17.

In Case A in Embodiment 17, when the first transmission node and the second transmission node are the same, the first transmission node is the third node in the present disclosure, and the second transmission node is the third node in the present disclosure, the first time-frequency resource set belongs to the target resource sub-pool, or, the first time-frequency resource set belongs to a time-frequency resource unit other than the target resource sub-pool.

In one embodiment, a transmitter for the first signaling and a transmitter for the second signaling are different, while a target receiver for the first signaling and a target receiver for the second signaling are the same, the first time-frequency resource set belongs to the target resource sub-pool, or, the first time-frequency resource set belongs to a time-frequency resource unit other than the target resource sub-pool.

In one subembodiment, the first time-frequency resource set belongs to the target resource sub-pool.

In one subembodiment, the first time-frequency resource set does not belong to the target resource sub-pool.

In one subembodiment, the first time-frequency resource set belongs to a time-frequency resource unit other than the target resource sub-pool.

In one subembodiment, the first transmission node and the second transmission node are the first node in the present disclosure.

In one subembodiment, a transmitter for the first signaling and a transmitter for the second signaling are non-Co-located.

In one subembodiment, a transmitter for the first signaling is the second node in the present disclosure, while a transmitter for the second signaling is the first node in the present disclosure.

In one subembodiment, a target receiver for the first signaling and a target receiver for the second signaling are Co-located.

In one subembodiment, a target receiver for the first signaling and a target receiver for the second signaling are the third node in the present disclosure.

In Case B in Embodiment 17, when the first transmission node and the second transmission node are the same, the first transmission node is the first node in the present disclosure, and the second transmission node is the third node in the present disclosure, the first time-frequency resource set belongs to the target resource sub-pool, or, the first time-frequency resource set belongs to a time-frequency resource unit other than the target resource sub-pool.

In one embodiment, a target receiver for the first signaling and a transmitter for the second signaling are the same, the first time-frequency resource set belongs to the target resource sub-pool, or, the first time-frequency resource set belongs to a time-frequency resource unit other than the target resource sub-pool.

In one subembodiment, the first time-frequency resource set belongs to the target resource sub-pool.

In one subembodiment, the first time-frequency resource set does not belong to the target resource sub-pool.

In one subembodiment, the first time-frequency resource set belongs to a time-frequency resource unit other than the target resource sub-pool.

In one subembodiment, a target receiver for the first signaling and a transmitter for the second signaling are Co-located.

In one subembodiment, a target receiver for the first signaling and a target receiver for the second signaling are Non-Co-located.

In one subembodiment, a target receiver for the first signaling is the second node in the present disclosure, and a transmitter for the second signaling is also the second node in the present disclosure.

In Case C in Embodiment 17, when the first transmission node and the second transmission node are different, the first time-frequency resource set belongs to the target resource sub-pool.

In one subembodiment, a target receiver for the first signaling and a transmitter for the second signaling are Non-Co-located.

In one subembodiment, a target receiver for the first signaling and a target receiver for the second signaling are Non-Co-located.

In one embodiment, the non-co-located means that a Backhaul Link between two communication nodes is undesirable (i.e., delay is not negligible).

In one embodiment, the non-co-located means that two communication nodes do not share a same set of BaseBand equipment.

In one embodiment, the co-located means that a Backhaul Link between two communication nodes is desirable (i.e., delay is not negligible).

In one embodiment, the co-located means that two communication nodes share a same set of BaseBand equipment.

Embodiment 18

Figure 18:
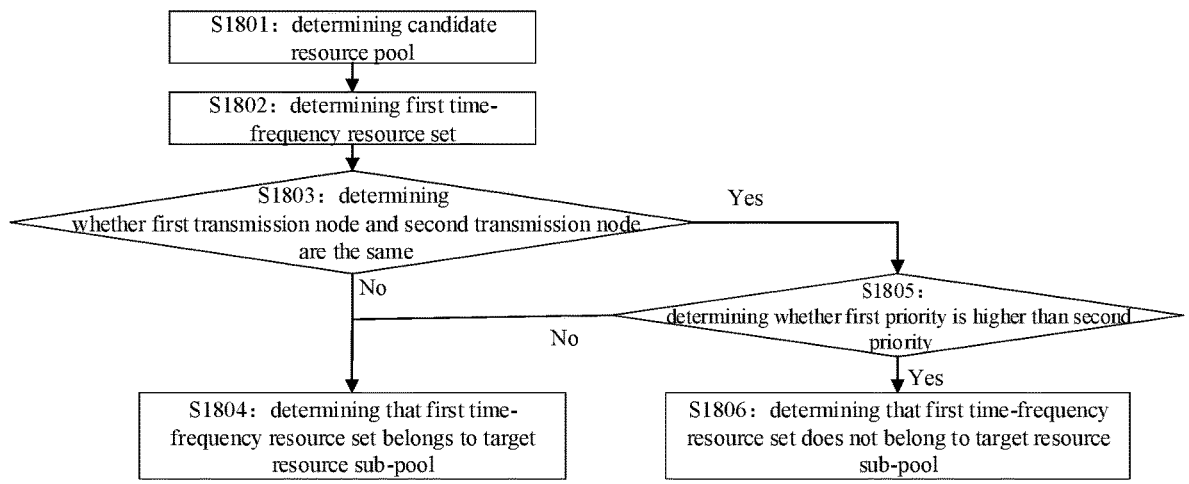
FIG. 18 illustrates a flowchart of determining whether a first time-frequency resource set belongs to a target resource sub-pool according to one embodiment of the present disclosure.

Embodiment 18 illustrates a flowchart of determining whether a first time-frequency resource set belongs to a target resource sub-pool according to one embodiment of the present disclosure, as shown in FIG. 18. In Embodiment 18, determine a candidate resource pool in step S1801; determine a first time-frequency resource set in step S1802; and determine in step S1803 whether a first transmission node and a second transmission node are the same; when a result of "determining whether a first transmission node and a second transmission node are the same" is "NO", perform step S1804, to determine whether a first time-frequency resource set belongs to a target resource sub-pool; when a result of "determining whether a first transmission node and a second transmission node are the same" is "YES", perform step S1805, to determine whether a first priority is greater than a second priority; when a result of "determining whether a first priority is greater than a second priority" is "YES", perform step S1806 to determine that the first time-frequency resource set does not belong to a target resource sub-pool; when a result of "determining whether a first priority is greater than a second priority" is "NO", perform step S1804 to determine that the first time-frequency resource set belongs to a target resource sub-pool.

In one embodiment, the first priority is a positive integer.

In one embodiment, the first priority is configured by a higher layer signaling.

In one embodiment, the first priority is a positive integer among P positive integers, where P is a positive integer.

In one embodiment, the first priority is a positive integer of 1 through P.

In one embodiment, the first priority is a non-negative integer among P non-negative integers, where P is a positive integer.

In one embodiment, the first priority is a non-negative integer of 0 through (P−1).

In one embodiment, the first priority is a priority of data transmitted in the reference time-frequency resource set.

In one embodiment, the second priority is a positive integer.

In one embodiment, the second priority is configured by a higher layer signaling.

In one embodiment, the second priority is a positive integer among P positive integers, where P is a positive integer.

In one embodiment, the second priority is a positive integer of 1 through P.

In one embodiment, the second priority is a non-negative integer among P non-negative integers, where P is a positive integer.

In one embodiment, the second priority is a non-negative integer of 0 through (P−1).

In one embodiment, the second priority is a priority of data transmitted in the second time-frequency resource set.

In one embodiment, the first priority is equal to a first non-negative integer, the second priority is equal to a second non-negative integer, when the first priority is higher than the second priority, the first non-negative integer is greater than the second non-negative integer; when the first priority is lower than the second priority, the first non-negative integer is less than the second non-negative integer; when the first priority is equal to the second priority, the first non-negative integer is equal to the second non-negative integer.

In one embodiment, the first priority is equal to a first non-negative integer, the second priority is equal to a second non-negative integer, when the first priority is higher than the second priority, the first non-negative integer is less than the second non-negative integer; when the first priority is lower than the second priority, the first non-negative integer is greater than the second non-negative integer; when the first priority is equal to the second priority, the first non-negative integer is equal to the second non-negative integer.

In one embodiment, the first priority is equal to a first non-negative integer, the second priority is equal to a second non-negative integer, and a high-low relationship between the first priority and the second priority is monotonically increasing with a relative magnitude of the first non-negative integer and the second non-negative integer.

In one embodiment, the first priority is equal to a first non-negative integer, the second priority is equal to a second non-negative integer, and a high-low relationship between the first priority and the second priority is monotonically decreasing with a relative magnitude of the first non-negative integer and the second non-negative integer.

In one embodiment, when the first transmission node and the second transmission node are different, the first time-frequency resource set belongs to the target resource sub-pool.

In one embodiment, the first transmission node and the second transmission node are the same, when the first priority is higher than the second priority, the first time-frequency resource set belongs to a time-frequency resource unit other than the target resource sub-pool.

In one embodiment, the first transmission node and the second transmission node are the same, when the first priority is lower than the second priority, the first time-frequency resource set belongs to the target resource sub-pool.

In one embodiment, the first transmission node and the second transmission node are the same, when the first priority is equal to the second priority, the first time-frequency resource set belongs to the target resource sub-pool.

Embodiment 19

Figure 19:
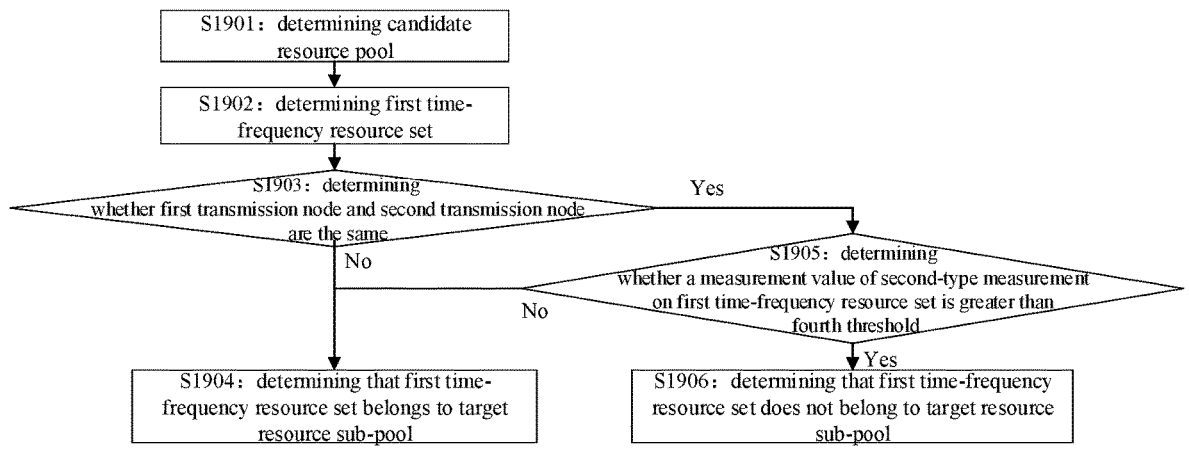
FIG. 19 illustrates a flowchart of determining whether a first time-frequency resource set belongs to a target resource sub-pool according to one embodiment of the present disclosure.

Embodiment 19 illustrates a flowchart of determining whether a first time-frequency resource set belongs to a target resource sub-pool according to one embodiment of the present disclosure, as shown in FIG. 19. In Embodiment 19, determine a candidate resource pool in step S1901; determine a first time-frequency resource set in step S1902; and determine in step S1903 whether a first transmission node and a second transmission node are the same; when a result of "determining whether a first transmission node and a second transmission node are the same" is "NO", perform step S1904, to determine whether a first time-frequency resource set belongs to a target resource sub-pool; when a result of "determining whether a first transmission node and a second transmission node are the same" is "YES", perform step S1905, to determine whether a measurement value of a second-type measurement on a first time-frequency resource set is greater than a fourth threshold; when a result of "determining whether a measurement value of a second-type measurement on a first time-frequency resource set is greater than a fourth threshold" is "YES", perform step S1906 to determine that the first time-frequency resource set does not belong to a target resource sub-pool; when a result of "determining whether a measurement value of a second-type measurement on a first time-frequency resource set is greater than a fourth threshold" is "NO", perform step S1904 to determine that the first time-frequency resource set belongs to a target resource sub-pool.

In one embodiment, the first transmission node and the second transmission node are the same, when a measurement value of a second-type measurement on the first time-frequency resource set is greater than the fourth threshold, the first time-frequency resource set belongs to a time-frequency resource unit other than the target resource sub-pool.

In one embodiment, the first transmission node and the second transmission node are the same, when a measurement value of a second-type measurement on the first time-frequency resource set is less than the fourth threshold, the first time-frequency resource set belongs to the target resource sub-pool.

In one embodiment, the first transmission node and the second transmission node are the same, when a measurement value of a second-type measurement on the first time-frequency resource set is equal to the fourth threshold, the first time-frequency resource set belongs to the target resource sub-pool.

In one embodiment, a second-type measurement on the first time-frequency resource set is a PSSCH-RSRP measurement.

In one embodiment, a second-type measurement on the first time-frequency resource set is a PSCCH-RSRP measurement.

In one embodiment, a second-type measurement on the first time-frequency resource set is an RSRP measurement of DMRS of PSSCHs.

In one embodiment, a second-type measurement on the first time-frequency resource set is a filtered RSRP measurement.

In one embodiment, a second-type measurement on the first time-frequency resource set is a L1-filtered RSRP measurement.

In one embodiment, a second-type measurement on the first time-frequency resource set is a L3-filtered RSRP measurement.

In one embodiment, a second-type measurement on the first time-frequency resource set is a PL measurement.

In one embodiment, a second-type measurement on the first time-frequency resource set is a TX-RX distance measurement.

In one embodiment, a second-type measurement on the first time-frequency resource set is an RSSI measurement.

In one embodiment, a second-type measurement on the first time-frequency resource set is an S-RSSI measurement.

In one embodiment, a second-type measurement on the first time-frequency resource set is an RSRQ measurement.

In one embodiment, a second-type measurement on the first time-frequency resource set is an SNR measurement.

In one embodiment, a second-type measurement on the first time-frequency resource set is an SINR measurement.

In one embodiment, a positive integer number of second-type time-frequency resource sets are associated with the first time-frequency resource set, and any of the positive integer number of second-type time-frequency resource sets comprises a positive integer number of time-frequency resource unit(s).

In one embodiment, there is an equal number of time-domain resource units between any two second-type time-frequency resource sets among the positive integer number of second-type time-frequency resource sets.

In one embodiment, any of the positive integer number of second-type time-frequency resource sets comprises a positive integer number of multicarrier symbol(s).

In one embodiment, any of the positive integer number of second-type time-frequency resource sets comprises a slot.

In one embodiment, any of the positive integer number of second-type time-frequency resource sets comprises a subframe.

In one embodiment, the positive integer number of second-type time-frequency resource sets comprise same frequency-domain resources as the first time-frequency resource set.

In one embodiment, the positive integer number of second-type time-frequency resource sets are successively different from the first time-frequency resource set by a positive integer number of time-domain resource unit(s) in time domain.

In one embodiment, the positive integer number of second-type time-frequency resource sets and the first time-frequency resource set are TDM.

In one embodiment, any of the positive integer number of second-type time-frequency resource sets is earlier than the first time-frequency resource set.

In one embodiment, the positive integer number of second-type time-frequency resource sets and the first time-frequency resource set are periodic.

In one embodiment, a second-type measurement on the first time-frequency resource set is to monitor the positive integer number of second-type time-frequency resource sets.

In one embodiment, a second-type measurement on the first time-frequency resource set is to receive a fourth signaling on any of the positive integer number of second-type time-frequency resource sets and calculate an RSSI.

In one embodiment, the fourth signaling is transmitted in any of the positive integer number of second-type time-frequency resource sets.

In one embodiment, a second-type measurement performed on the first time-frequency resource set is to receive a positive integer number of fourth-type signalings respectively in the positive integer number of second-type time-frequency resource sets, and calculate RSRP, where the fourth signaling is one of the positive integer number of fourth-type signalings.

In one embodiment, the positive integer number of fourth-type signalings are respectively transmitted in the positive integer number of second-type time-frequency resource sets.

In one embodiment, a measurement value obtained by a second-type measurement on the first time-frequency resource set is higher than the fourth threshold.

In one embodiment, a measurement value obtained by a second-type measurement on the first time-frequency resource set is in dBm.

In one embodiment, a measurement value obtained by a second-type measurement on the first time-frequency resource set is in dB.

In one embodiment, a measurement value obtained by a second-type measurement on the first time-frequency resource set is in mW.

In one embodiment, a measurement value obtained by a second-type measurement on the first time-frequency resource set is in W.

In one embodiment, the fourth threshold is a threshold among a positive integer number of thresholds comprised in the first threshold list.

In one embodiment, the fourth threshold is measured in dBm.

In one embodiment, the fourth threshold is measured in dB.

In one embodiment, the fourth threshold is measured in W.

In one embodiment, the fourth threshold is measured in mW.

In one embodiment, the fourth threshold is a threshold in [−infinity dBm, −128 dBm, −126 dBm . . . , 0 dBm, infinity dBm].

In one embodiment, the fourth threshold is equal to $(-128+(n-1)*2)$ dBm, where n is an index of the fourth threshold in the first threshold list, the n being a positive integer of 1 through 65.

Embodiment 20

Figure 20:
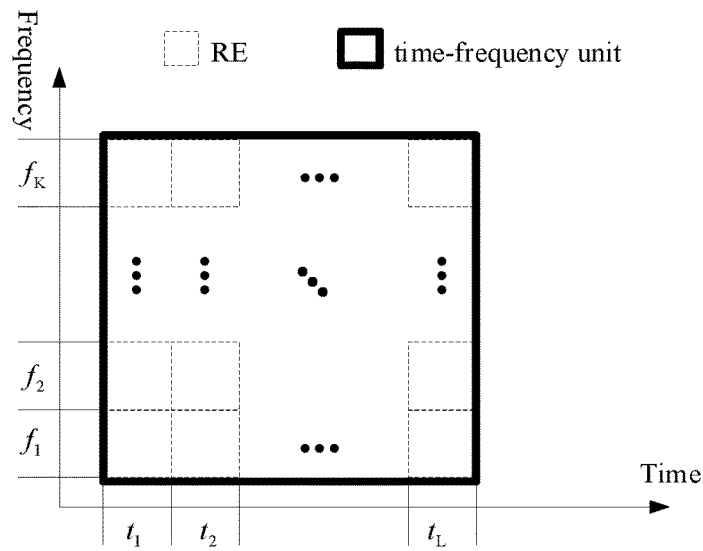
FIG. 20 illustrates a schematic diagram of a time-frequency resource unit according to one embodiment of the present disclosure.

Embodiment 20 illustrates a schematic diagram illustrating a time-frequency resource unit according to one embodiment of the present disclosure, as shown in FIG. 20. In FIG. 20, each small dotted-line box represents a Resource Element (RE), and the thick-line framed box represents a time-frequency resource unit. In FIG. 20, a time-frequency resource unit occupies K subcarriers in frequency domain and L multicarrier symbol(s) in time domain, where K and L are positive integers. In FIG. 20, $t_1, t_2 \ldots,$ and $t_L$ denote the L Symbol(s), while $f_1, f_2 \ldots,$ and $f_K$ denote the K Subcarriers.

In Embodiment 20, a time-frequency resource unit occupies the K subcarriers in frequency domain and the L multicarrier symbol(s) in time domain, where the K and L are positive integers.

In one embodiment, K is equal to 12.

In one embodiment, K is equal to 72.

In one embodiment, L is equal to 1.

In one embodiment, L is equal to 2.

In one embodiment, L is no greater than 14.

In one embodiment, any of the L multicarrier symbol(s) is an OFDM symbol.

In one embodiment, any of the L multicarrier symbol(s) is a SC-FDMA symbol.

In one embodiment, any of the L multicarrier symbol(s) is a DFT-S-OFDM symbol.

In one embodiment, any of the L multicarrier symbol(s) is a Frequency Division Multiple Access (FDMA) symbol.

In one embodiment, any of the L multicarrier symbol(s) is a Filter Bank Multi-Carrier (FBMC) symbol.

In one embodiment, any of the L multicarrier symbol(s) is an Interleaved Frequency Division Multiple Access (IF-DMA) symbol.

In one embodiment, the time-domain resource unit comprises a Radio Frame.

In one embodiment, the time-domain resource unit comprises a Subframe.

In one embodiment, the time-domain resource unit comprises a Slot.

In one embodiment, the time-domain resource unit comprises a positive integer number of multicarrier symbol(s).

In one embodiment, the time-domain resource unit comprises a multicarrier symbol.

In one embodiment, the frequency-domain resource unit comprises a Carrier.

In one embodiment, the frequency-domain resource unit comprises a Bandwidth Part (BWP).

In one embodiment, the frequency-domain resource unit comprises a Subchannel.

In one embodiment, any of the positive integer number of sub-channel(s) comprises a positive integer number of Resource Block(s) (RB(s)).

In one embodiment, the sub-channel is comprised of a positive integer number of RB(s).

In one embodiment, any of the positive integer number of RB(s) comprises a positive integer number of subcarrier(s) in frequency domain.

In one embodiment, any of the positive integer number of RB(s) comprises 12 subcarriers in frequency domain.

In one embodiment, the sub-channel is comprised of a positive integer number of PRB(s).

In one embodiment, the number of PRB(s) comprised in the sub-channel is variable.

In one embodiment, the sub-channel is comprised of 10 PRBs.

In one embodiment, the sub-channel is comprised of 20 PRBs.

In one embodiment, the sub-channel is comprised of 100 PRBs.

In one embodiment, any of the positive integer number of PRB(s) comprises a positive integer number of subcarrier(s) in frequency domain.

In one embodiment, any of the positive integer number of PRB(s) comprises 12 subcarriers in frequency domain.

In one embodiment, the frequency-domain resource unit comprises an RB.

In one embodiment, the frequency-domain resource unit comprises a PRB.

In one embodiment, the frequency-domain resource unit comprises a positive integer number of subcarrier(s).

In one embodiment, the frequency-domain resource unit is a subcarrier.

In one embodiment, the time-frequency resource unit comprises the time-domain resource unit in time domain.

In one embodiment, the time-frequency resource unit comprises the frequency-domain resource unit in frequency domain.

In one embodiment, the time-frequency resource unit comprises R RE(s), where R is a positive integer.

In one embodiment, the time-frequency resource unit consists of R RE(s), where R is a positive integer.

In one embodiment, any of the R RE(s) occupies a multicarrier symbol in time domain, and a subcarrier in frequency domain.

In one embodiment, the subcarrier spacing is measured in Hz (i.e., Hertz).

In one embodiment, the subcarrier spacing is measured in kHz (i.e., Kilohertz).

In one embodiment, the subcarrier spacing is measured in MHz (i.e., Megahertz).

In one embodiment, a symbol length of the multicarrier symbol is measured in sampling points.

In one embodiment, a symbol length of the multicarrier symbol is measured in microseconds (μs).

In one embodiment, a symbol length of the multicarrier symbol is measured in milliseconds (ms).

In one embodiment, the subcarrier spacing is at least one of 1.25 kHz, 2.5 kHz, 5 kHz, 15 kHz, 30 kHz, 60 kHz, 120 kHz or 240 kHz.

In one embodiment, the time-frequency resource unit comprises the K subcarriers and the L multicarrier symbol(s), where a product of K and L is no smaller than R.

In one embodiment, the time-frequency resource unit does not comprises REs allocated to a Guard Period (GP).

In one embodiment, the time-frequency resource unit does not comprises REs allocated to a Reference Signal (RS).

In one embodiment, the time-frequency resource unit comprises a positive integer number of RB(s).

In one embodiment, the time-frequency resource unit belongs to an RB.

In one embodiment, the time-frequency resource unit is equivalent to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equivalent to a PRB in frequency domain.

In one embodiment, the time-frequency resource unit comprises a positive integer number of Virtual Resource Block(s) (VRB(s)).

In one embodiment, the time-frequency resource unit belongs to a VRB.

In one embodiment, the time-frequency resource unit is equivalent to a VRB in frequency domain.

In one embodiment, the time-frequency resource unit comprises a positive integer number of PRB pair(s).

In one embodiment, the time-frequency resource unit belongs to a PRB pair.

In one embodiment, the time-frequency resource unit is equivalent to a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is equivalent to a radio frame in time domain.

In one embodiment, the time-frequency resource unit comprises a positive integer number of subframe(s).

In one embodiment, the time-frequency resource unit belongs to a subframe.

In one embodiment, the time-frequency resource unit is equivalent to a subframe in time domain.

In one embodiment, the time-frequency resource unit comprises a positive integer number of slot(s).

In one embodiment, the time-frequency resource unit belongs to a slot.

In one embodiment, the time-frequency resource unit is equivalent to a slot in time domain.

In one embodiment, the time-frequency resource unit comprises a positive integer number of Symbol(s).

In one embodiment, the time-frequency resource unit belongs to a symbol.

In one embodiment, the time-frequency resource unit is equivalent to a symbol in time domain.

In one embodiment, a duration of the time-domain resource unit in the present disclosure is equal to a duration of the time-frequency resource unit in the present disclosure in time domain.

In one embodiment, a number of multicarrier symbol(s) occupied by the time-frequency resource unit in the present disclosure in time domain is equal to a number of multicarrier symbol(s) occupied by the time-domain resource unit in time domain.

In one embodiment, a number of subcarrier(s) occupied by the frequency-domain resource unit in the present disclosure is equal to a number of subcarrier(s) occupied by the time-frequency resource unit in the present disclosure in frequency domain.

Embodiment 21

Figure 21:
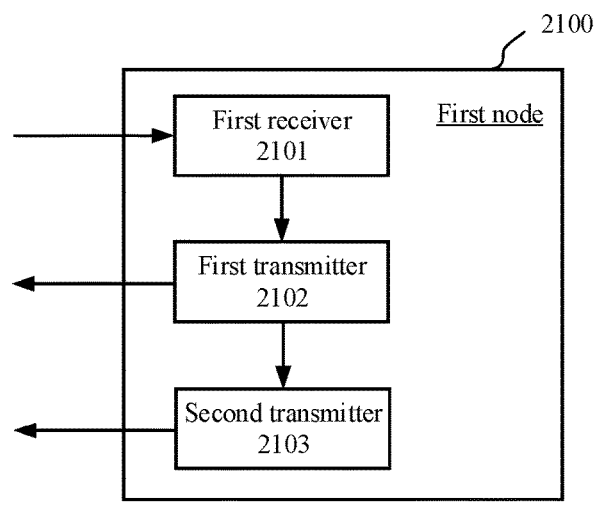
FIG. 21 illustrates a structure block diagram of a processing device in a first node according to one embodiment of the present disclosure.

Embodiment 21 illustrates a structure block diagram of a processing device used in a first node, as shown in FIG. 21. In Embodiment 21, a processing device 2100 in the first node is comprised of a first receiver 2101, a first transmitter 2102 and a second transmitter 2103.

In one embodiment, the first receiver 2101 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 2102 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the second transmitter 2103 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 21, the first receiver 2101 receives a first signaling, the first signaling being used to determine a first identifier and a first priority; the first transmitter 2102 transmits a second signaling, the second signaling being used to indicate a second identifier and a second priority; and the second transmitter 2103 transmits a first signal in a second time-frequency resource set, the second time-frequency resource set belonging to a target resource sub-pool; the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

According to one aspect of the present disclosure, the above method is characterized in that the reference time-frequency resource set is used to determine a reference radio resource set, the first time-frequency resource set is used to determine a first radio resource set; time-domain resources comprised in the reference radio resource set and time-domain resources comprised in the first radio resource set are non-orthogonal.

In one embodiment, the first receiver 2101 receives first information; the first information is used to determine a first time window, time-domain resources comprised in the reference time-frequency resource set belong to the first time window, and time-domain resources comprised in the first time-frequency resource set belong to the first time window.

In one embodiment, the first receiver 2101 determines a first resource pool; the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

In one embodiment, a ratio of a number of time-frequency resource units comprised in the candidate resource pool to a number of time-frequency resource units comprised in the first resource pool is no less than a second threshold; the second threshold is pre-defined, or the second threshold is configurable.

In one embodiment, a ratio of a number of time-frequency resource units comprised in the target resource sub-pool to a number of time-frequency resource units comprised in the first resource pool is no less than a third threshold; the third threshold is pre-defined, or the third threshold is configurable.

In one embodiment, the first receiver 2101 monitors a second signal; the second signal is used to determine whether the first signal is correctly received; when the second signal is transmitted, the second signal occupies a second radio resource set; the second time-frequency resource set is used to determine the second radio resource set.

In one embodiment, when the first transmission node and the second transmission node are not the same, the first time-frequency resource set belongs to the target resource sub-pool.

In one embodiment, when the first transmission node and the second transmission node are the same, a high-low relationship between the first priority and the second priority is used to determine whether the first time-frequency resource set belongs to the target resource sub-pool.

In one embodiment, when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

In one embodiment, when the first transmission node and the second transmission node are the same, whether the first transmission node is the same as the first node 2101 is used to determine whether the first time-frequency resource set belongs to the target resource sub-pool.

In one embodiment, the first node 2100 is a UE.

In one embodiment, the first node 2100 is a relay node.

In one embodiment, the first node 2100 is abase station.

In one embodiment, the first node 2100 is vehicle-mounted communication equipment.

In one embodiment, the first node 2100 is a UE supporting V2X communications.

In one embodiment, the first node 2100 is a relay node supporting V2X communications.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network equipment in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first signaling, the first signaling being used to determine a first identifier and a first priority;
a first transmitter, which transmits a second signaling, the second signaling being used to indicate a second identifier and a second priority; and
a second transmitter, which transmits a first signal in a second time-frequency resource set, the second time-frequency resource set belonging to a target resource sub-pool;
wherein the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

2. The first node according to claim 1, wherein when the first transmission node and the second transmission node are not the same, the first time-frequency resource set belongs to the target resource sub-pool.

3. The first node according to claim 1, wherein when the first transmission node and the second transmission node are the same, a high-low relationship between the first priority and the second priority is used to determine whether the first time-frequency resource set belongs to the target resource sub-pool.

4. The first node according to claim 1, wherein when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

5. The first node according to claim 1, wherein when the first transmission node and the second transmission node are the same, whether the first transmission node is the same as the first node is used to determine whether the first time-frequency resource set belongs to the target resource sub-pool.

6. The first node according to claim 1, wherein the reference time-frequency resource set is used to determine a reference radio resource set, the first time-frequency resource set is used to determine a first radio resource set; time-domain resources comprised in the reference radio resource set and time-domain resources comprised in the first radio resource set are non-orthogonal.

7. The first node according to claim 6, wherein the first receiver receives first information; herein, the first information is used to determine a first time window, time-domain resources comprised in the reference time-frequency resource set belong to the first time window, and time-domain resources comprised in the first time-frequency resource set belong to the first time window;
or, the first receiver determines a first resource pool; herein, the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold;

or, the first receiver receives first information and determines a first resource pool; herein, the first information is used to determine a first time window, time-domain resources comprised in the reference time-frequency resource set belong to the first time window, and time-domain resources comprised in the first time-frequency resource set belong to the first time window; the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

8. The first node according to claim 7, wherein a ratio of a number of time-frequency resource units comprised in the candidate resource pool to a number of time-frequency resource units comprised in the first resource pool is no less than a second threshold; the second threshold is pre-defined, or the second threshold is configurable;

or, a ratio of a number of time-frequency resource units comprised in the target resource sub-pool to a number of time-frequency resource units comprised in the first resource pool is no less than a third threshold; the third threshold is pre-defined, or the third threshold is configurable.

9. The first node according to claim 6, wherein the first receiver monitors a second signal; herein, the second signal is used to determine whether the first signal is correctly received; when the second signal is transmitted, the second signal occupies a second radio resource set; the second time-frequency resource set is used to determine the second radio resource set.

10. The first node according to claim 1, wherein the first receiver receives first information; herein, the first information is used to determine a first time window, time-domain resources comprised in the reference time-frequency resource set belong to the first time window, and time-domain resources comprised in the first time-frequency resource set belong to the first time window;

or, the first receiver determines a first resource pool; herein, the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold;

or, the first receiver receives first information and determines a first resource pool; herein, the first information is used to determine a first time window, time-domain resources comprised in the reference time-frequency resource set belong to the first time window, and time-domain resources comprised in the first time-frequency resource set belong to the first time window; the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

11. The first node according to claim 10, wherein a ratio of a number of time-frequency resource units comprised in the candidate resource pool to a number of time-frequency resource units comprised in the first resource pool is no less than a second threshold; the second threshold is pre-defined, or the second threshold is configurable;

or, a ratio of a number of time-frequency resource units comprised in the target resource sub-pool to a number of time-frequency resource units comprised in the first resource pool is no less than a third threshold; the third threshold is pre-defined, or the third threshold is configurable.

12. The first node according to claim 10, wherein the first receiver monitors a second signal; herein, the second signal is used to determine whether the first signal is correctly received; when the second signal is transmitted, the second signal occupies a second radio resource set; the second time-frequency resource set is used to determine the second radio resource set.

13. The first node according to claim 1, wherein the first receiver monitors a second signal; herein, the second signal is used to determine whether the first signal is correctly received; when the second signal is transmitted, the second signal occupies a second radio resource set; the second time-frequency resource set is used to determine the second radio resource set.

14. A method in a first node for wireless communications, comprising:
receiving a first signaling, the first signaling being used to determine a first identifier and a first priority;
transmitting a second signaling, the second signaling being used to indicate a second identifier and a second priority; and
transmitting a first signal in a second time-frequency resource set, the second time-frequency resource set belonging to a target resource sub-pool;
wherein the first signaling is used to determine a reference time-frequency resource set, a first time-frequency resource set is related to the reference time-frequency resource set, the second signaling is used to indicate the second time-frequency resource set; the first identifier is used for identifying a first transmission node, while the second identifier is used for identifying a second transmission node; a relation between the first transmission node and the second transmission node, the first priority and the second priority are jointly used to determine whether the first time-frequency resource set belongs to the target resource sub-pool.

15. The method according to claim 14, wherein when the first transmission node and the second transmission node are not the same, the first time-frequency resource set belongs to the target resource sub-pool.

16. The method according to claim 14, wherein when the first transmission node and the second transmission node are the same, a high-low relationship between the first priority and the second priority is used to determine whether the first time-frequency resource set belongs to the target resource sub-pool.

17. The method according to claim 14, wherein when the first transmission node and the second transmission node are the same, a relative magnitude of a measurement value of a second-type measurement on the first time-frequency resource set and a fourth threshold is used to determine whether the first time-frequency resource set belongs to the target resource sub-pool.

18. The method according to claim 14, wherein when the first transmission node and the second transmission node are the same, whether the first transmission node is the same as the first node is used to determine whether the first time-frequency resource set belongs to the target resource sub-pool.

19. The method according to claim 14, wherein the reference time-frequency resource set is used to determine a reference radio resource set, the first time-frequency resource set is used to determine a first radio resource set; time-domain resources comprised in the reference radio resource set and time-domain resources comprised in the first radio resource set are non-orthogonal.

20. The method according to claim 14, comprising:
receiving first information;
wherein the first information is used to determine a first time window, time-domain resources comprised in the reference time-frequency resource set belong to the first time window, and time-domain resources comprised in the first time-frequency resource set belong to the first time window;
or, determining a first resource pool;
wherein, the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold;
or, receiving first information and determining a first resource pool;
wherein, the first information is used to determine a first time window, time-domain resources comprised in the reference time-frequency resource set belong to the first time window, and time-domain resources comprised in the first time-frequency resource set belong to the first time window; the target resource sub-pool belongs to a candidate resource pool, and the first time-frequency resource set belongs to the candidate resource pool, the candidate resource pool belonging to the first resource pool; when the first resource pool comprises a time-frequency resource unit other than the candidate resource pool, a first time-frequency resource unit is a time-frequency resource unit other than the candidate resource pool in the first resource pool, there is a third signaling being used to determine the first time-frequency resource unit and a measurement value obtained by a first-type measurement on the first time-frequency resource unit is greater than a first threshold, the third signaling being used to determine a third priority, the second priority and the third priority are jointly used to determine the first threshold.

* * * * *